(12) United States Patent
Laird et al.

(10) Patent No.: US 8,814,109 B2
(45) Date of Patent: Aug. 26, 2014

(54) POSITIVE LOCK ADJUSTABLE SEAT POST

(75) Inventors: Andrew Laird, Los Gatos, CA (US);
John L. Calendrille, Jr., Port Jefferson, NY (US)

(73) Assignee: Fox Factory, Inc., Scotts Valley, CA (US)

( * ) Notice: Subject to any disclaimer, the term of this patent is extended or adjusted under 35 U.S.C. 154(b) by 164 days.

(21) Appl. No.: 13/176,336

(22) Filed: Jul. 5, 2011

(65) Prior Publication Data

US 2012/0006949 A1   Jan. 12, 2012

Related U.S. Application Data

(60) Provisional application No. 61/361,376, filed on Jul. 2, 2010.

(51) Int. Cl.
*F16M 11/28* (2006.01)
*B62K 19/36* (2006.01)
*B62J 1/08* (2006.01)

(52) U.S. Cl.
USPC ........ 248/125.8; 248/161; 248/411; 248/412; 248/157; 248/423; 248/188.5; 280/226.1; 297/215.13; 297/215.14; 135/141; 135/142

(58) Field of Classification Search
USPC .............. 248/125.8, 161, 411, 412, 414, 157, 248/423, 188.5; 280/226.1; 297/215.13, 297/215.14; 135/141–142
See application file for complete search history.

(56) References Cited

U.S. PATENT DOCUMENTS

| 2,705,119 | A | * | 3/1955 | Ingwer | 248/55 |
|---|---|---|---|---|---|
| 3,560,033 | A | * | 2/1971 | Barkus | 3/107 |
| 5,542,150 | A | * | 8/1996 | Tu | 16/113.1 |
| 6,378,816 | B1 | * | 4/2002 | Pfister | 248/161 |
| 6,609,686 | B2 | * | 8/2003 | Malizia | 248/125.8 |
| 7,204,466 | B2 | * | 4/2007 | Hsieh | 248/410 |
| 7,306,206 | B2 | * | 12/2007 | Turner | 267/64.12 |
| 7,845,602 | B1 | * | 12/2010 | Young et al. | 248/125.8 |
| 8,256,732 | B1 | * | 9/2012 | Young et al. | 248/412 |
| 8,328,454 | B2 | * | 12/2012 | McAndrews et al. | 403/109.7 |
| 2002/0050112 | A1 | * | 5/2002 | Koch et al. | 52/651.07 |

* cited by examiner

*Primary Examiner* — Terrell McKinnon
*Assistant Examiner* — Christopher Garft
(74) *Attorney, Agent, or Firm* — Patterson & Sheridan, LLP; David M. Haugen

(57) ABSTRACT

A method and apparatus for a seat post assembly that is adjustable to an upper, intermediate, and lower seat post position using a locking member and a sleeve member coupled to an actuator for securing and releasing an inner tube with respect to an outer tube. The actuator may move the sleeve member to release the locking member from engagement with the outer tube to adjust the inner tube and thus the seat post assembly to the upper, intermediate, or lower seat post positions. The actuator and the sleeve may be biased into an initial position that urges the locking member into engagement with outer tube to lock the inner tube to the outer tube.

5 Claims, 48 Drawing Sheets

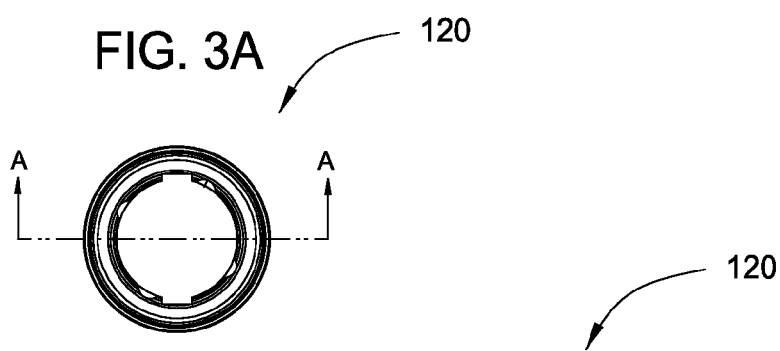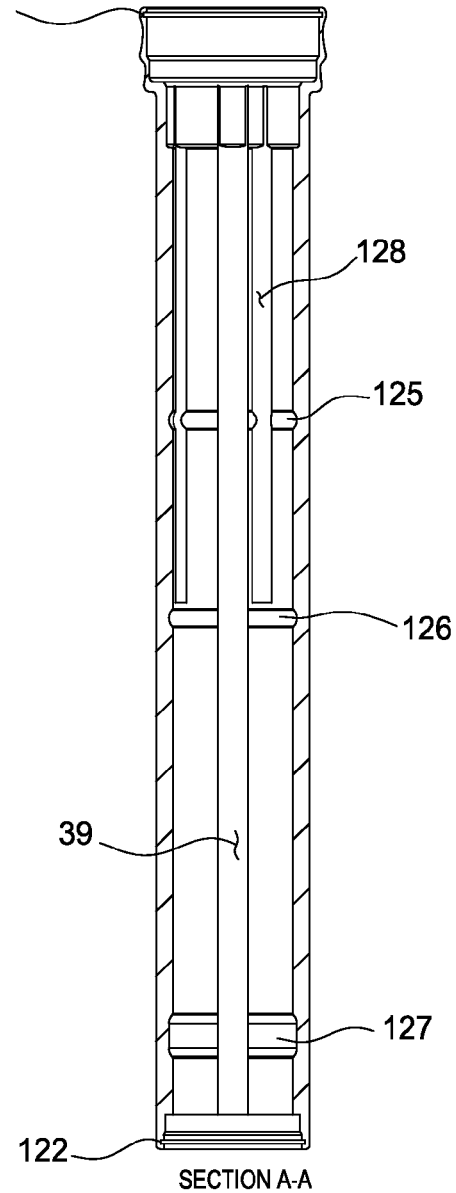
FIG. 3B    FIG. 3C

FIG. 4A
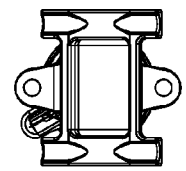
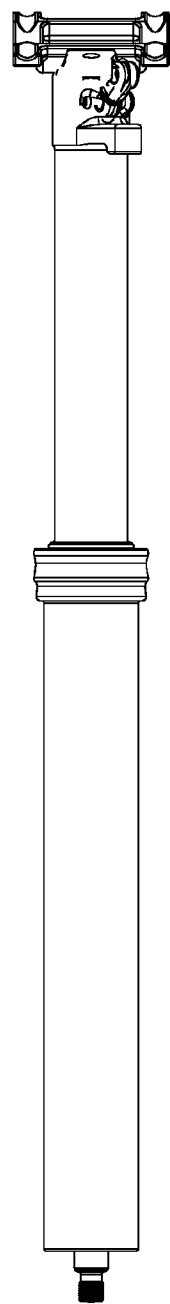
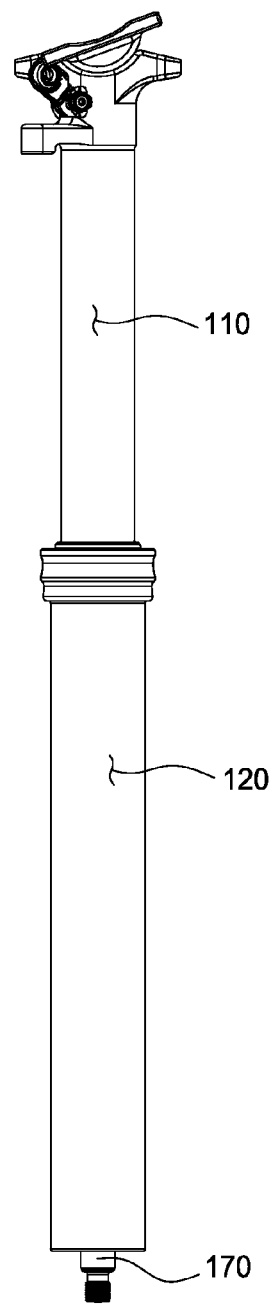
FIG. 4B        FIG. 4C

SECTION E-E

SECTION F-F

SECTION G-G

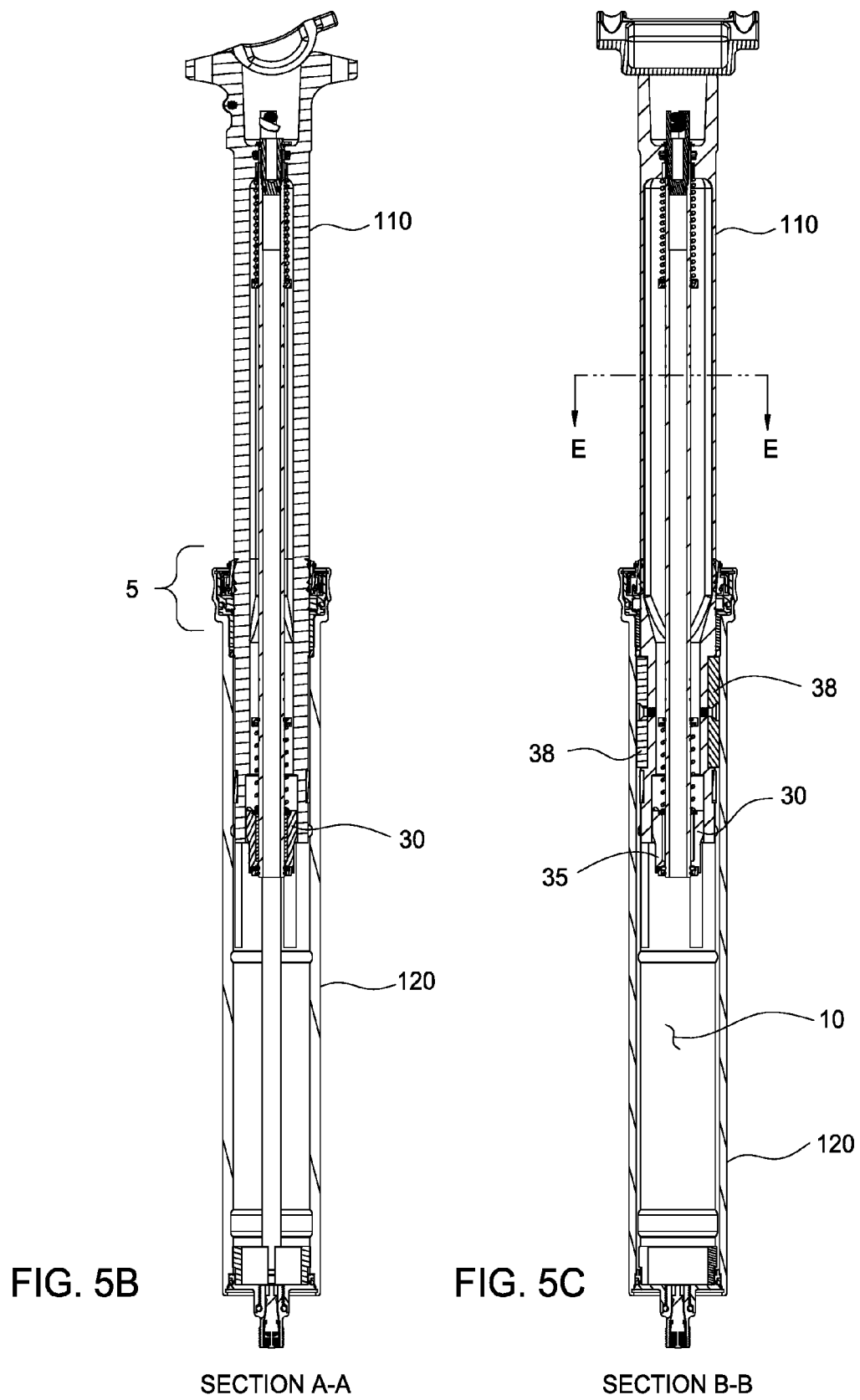

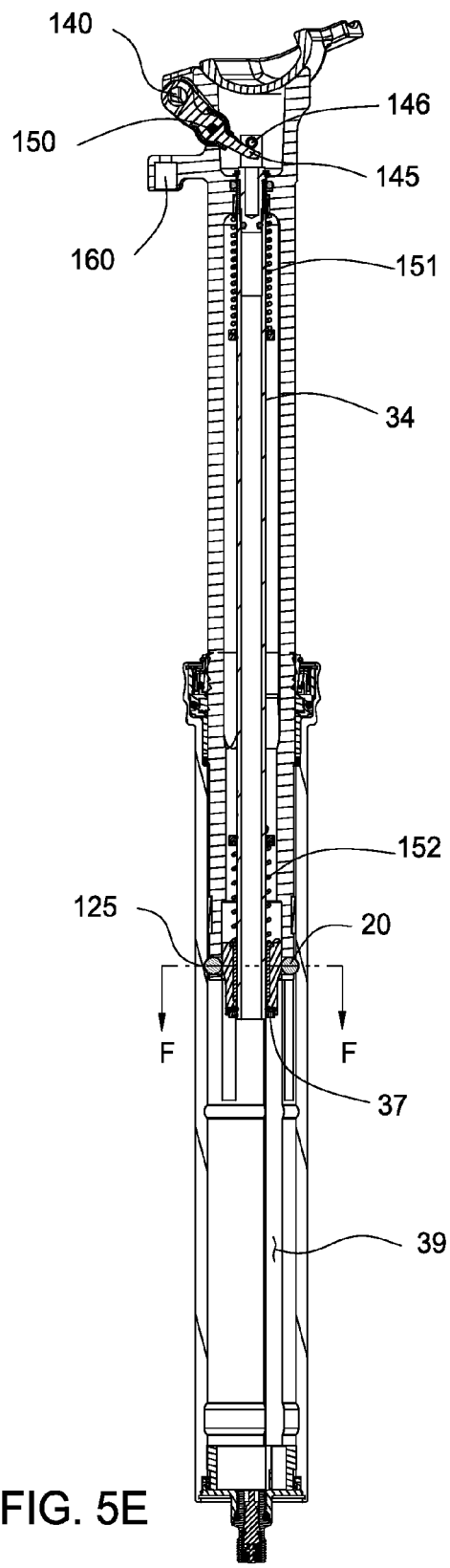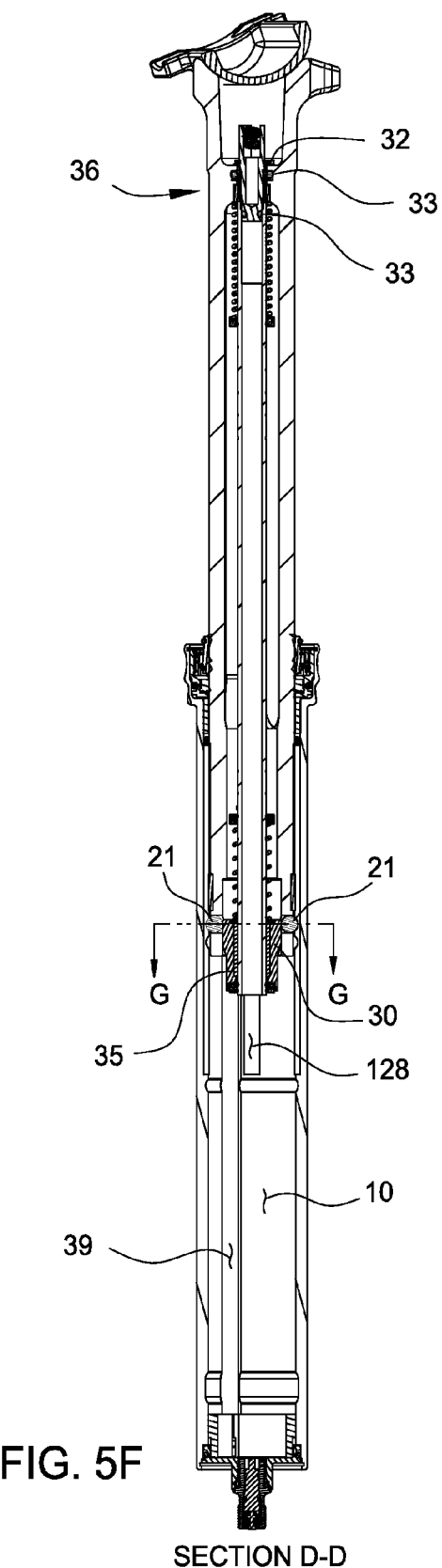
FIG. 5E  SECTION C-C
FIG. 5F  SECTION D-D

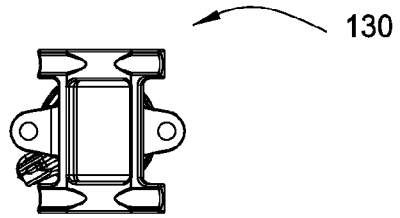
FIG. 6A
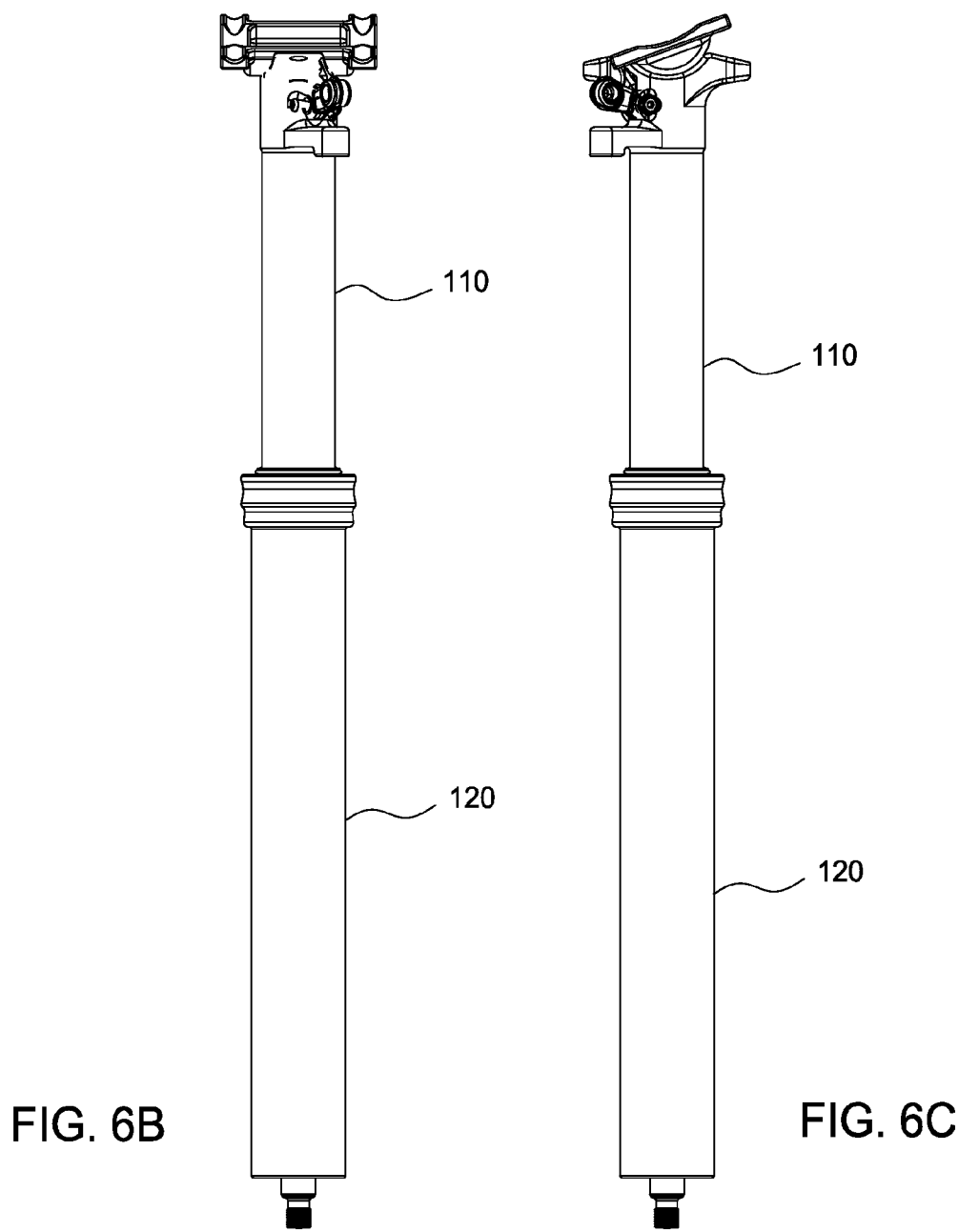
FIG. 6B
FIG. 6C

SECTION E-E

SECTION F-F

SECTION G-G

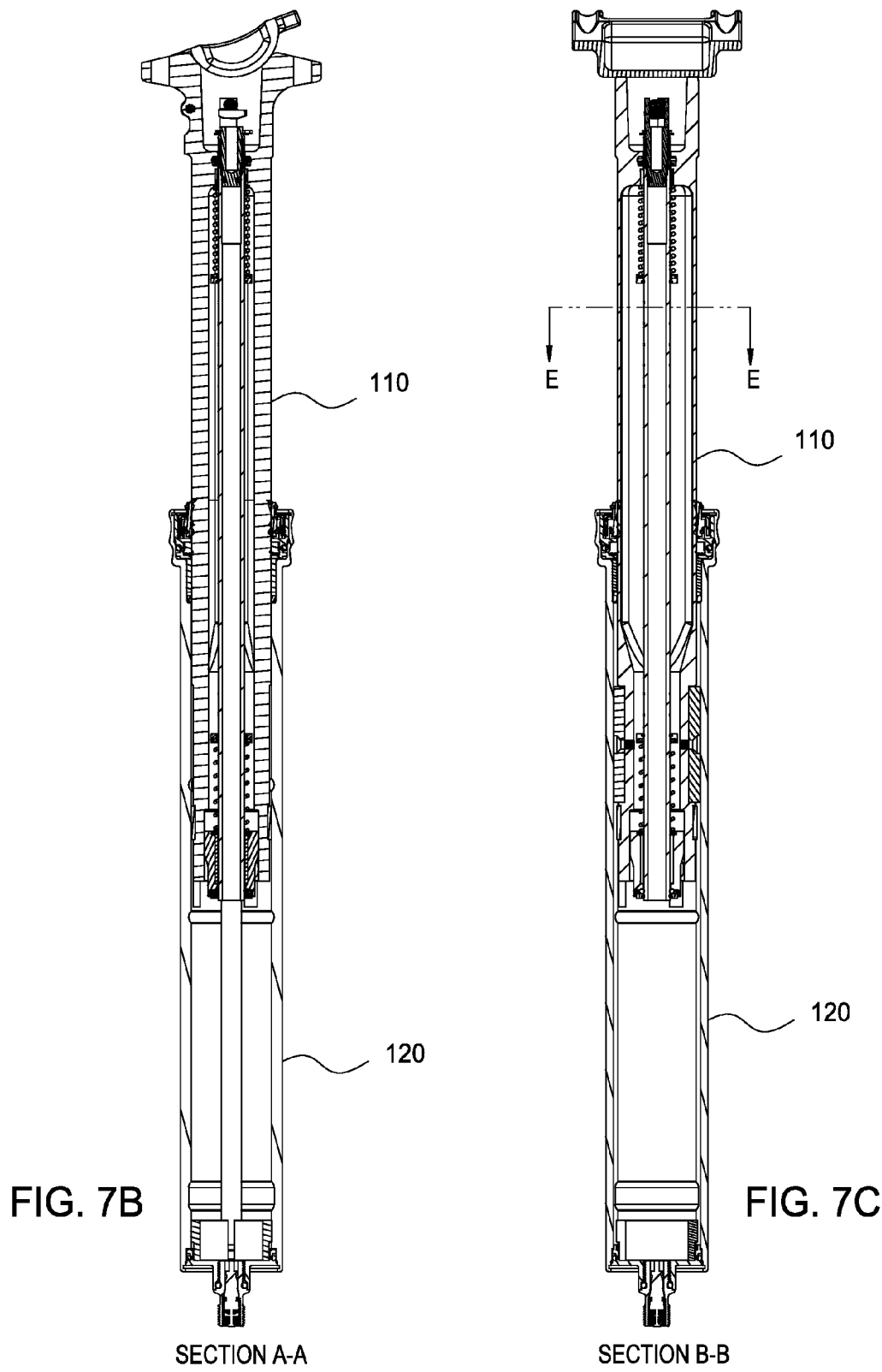

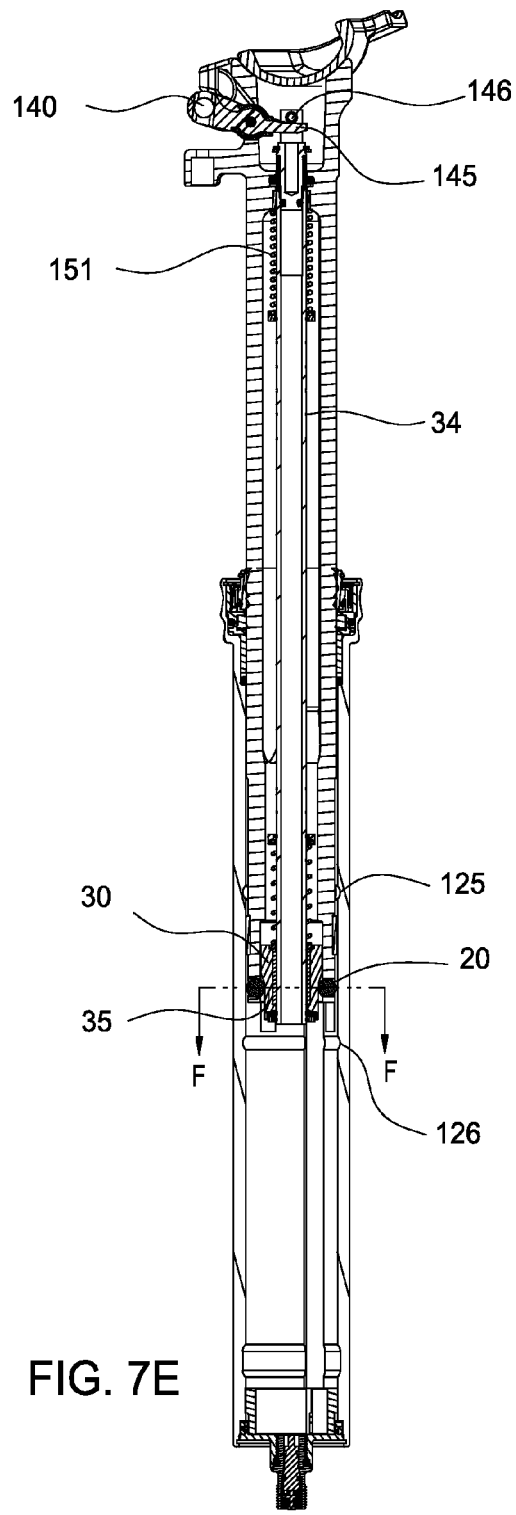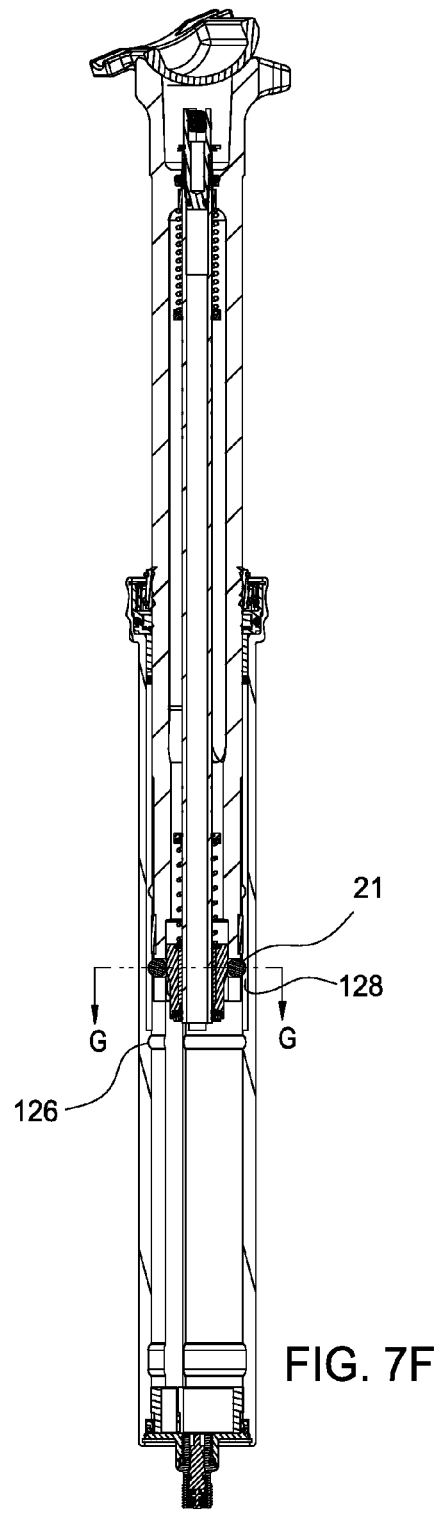
FIG. 7E  SECTION C-C
FIG. 7F  SECTION D-D

SECTION E-E

SECTION F-F

SECTION G-G

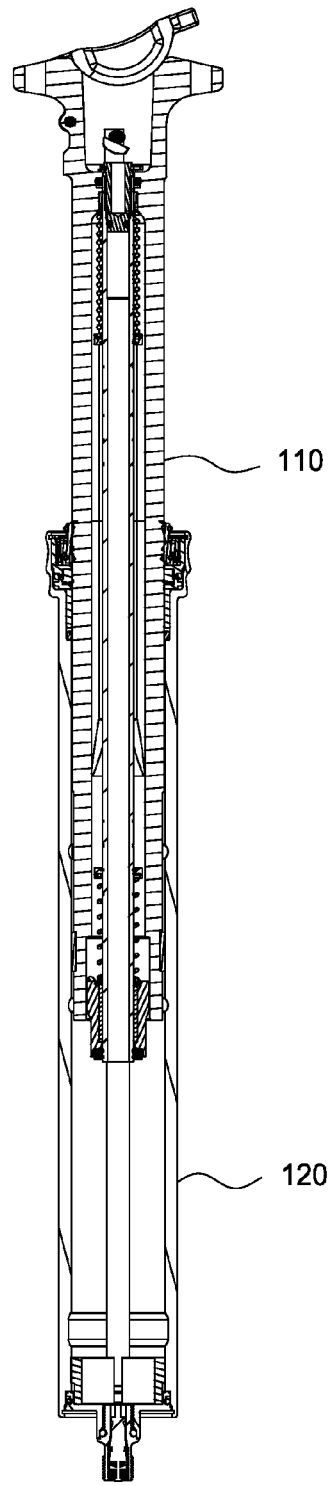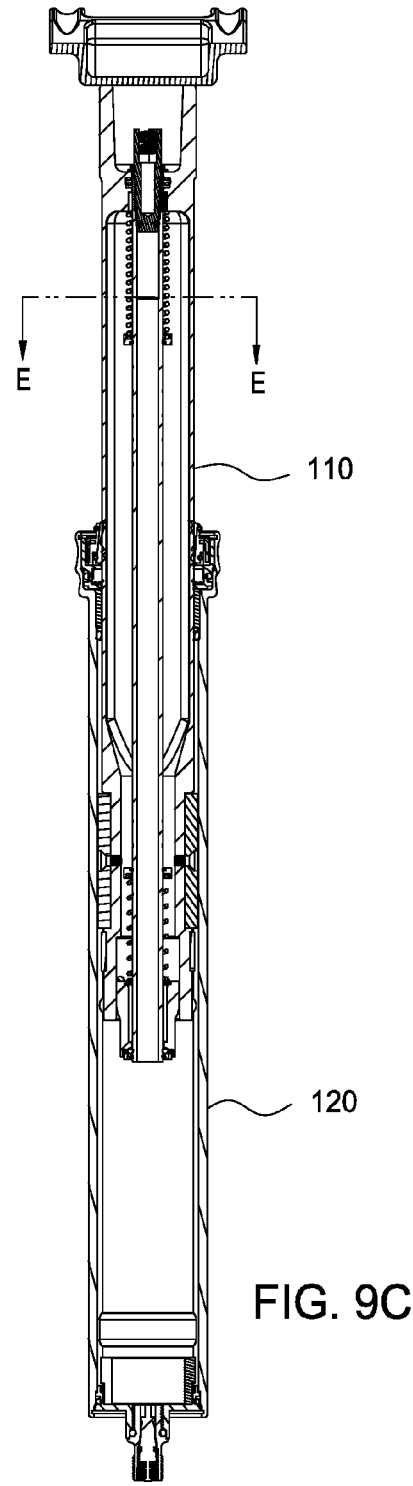
FIG. 9B  SECTION A-A
FIG. 9C  SECTION B-B

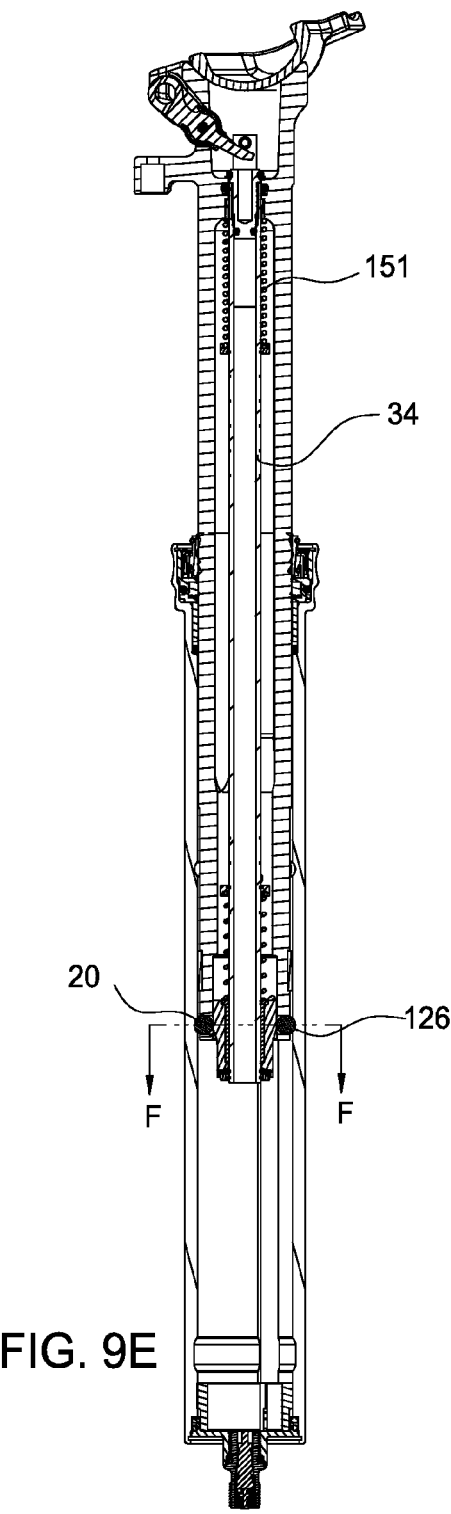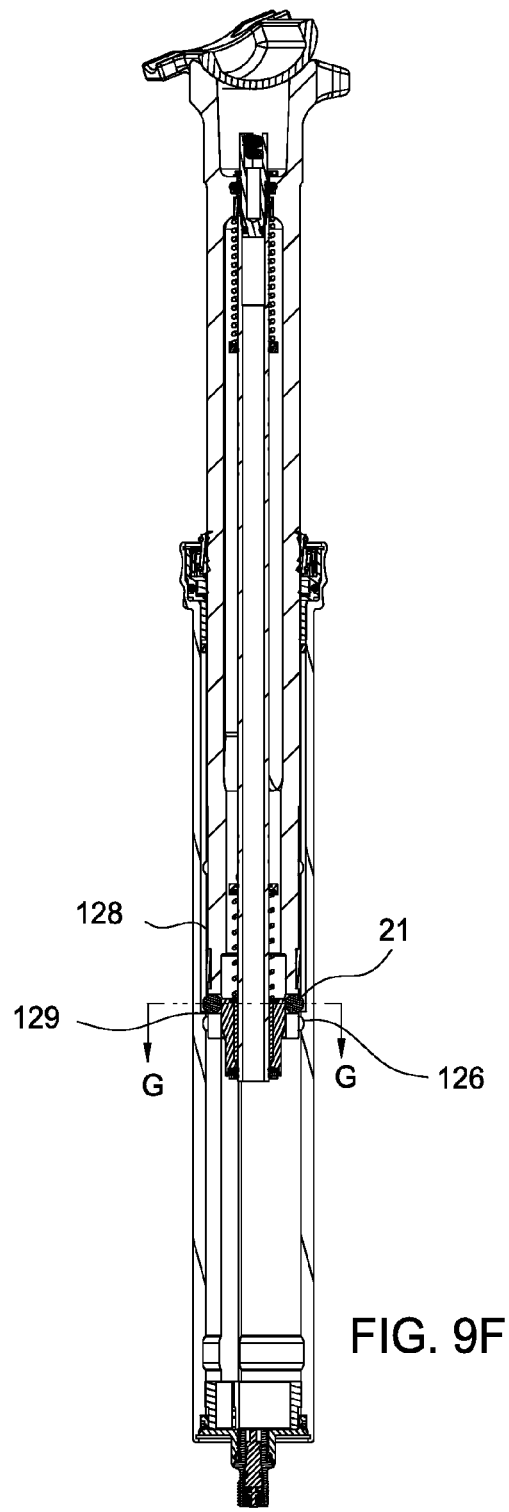
FIG. 9E SECTION C-C
FIG. 9F SECTION D-D

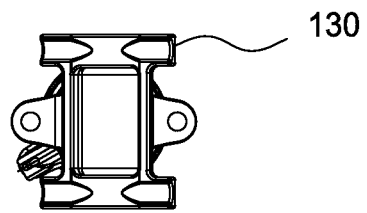
FIG. 10A
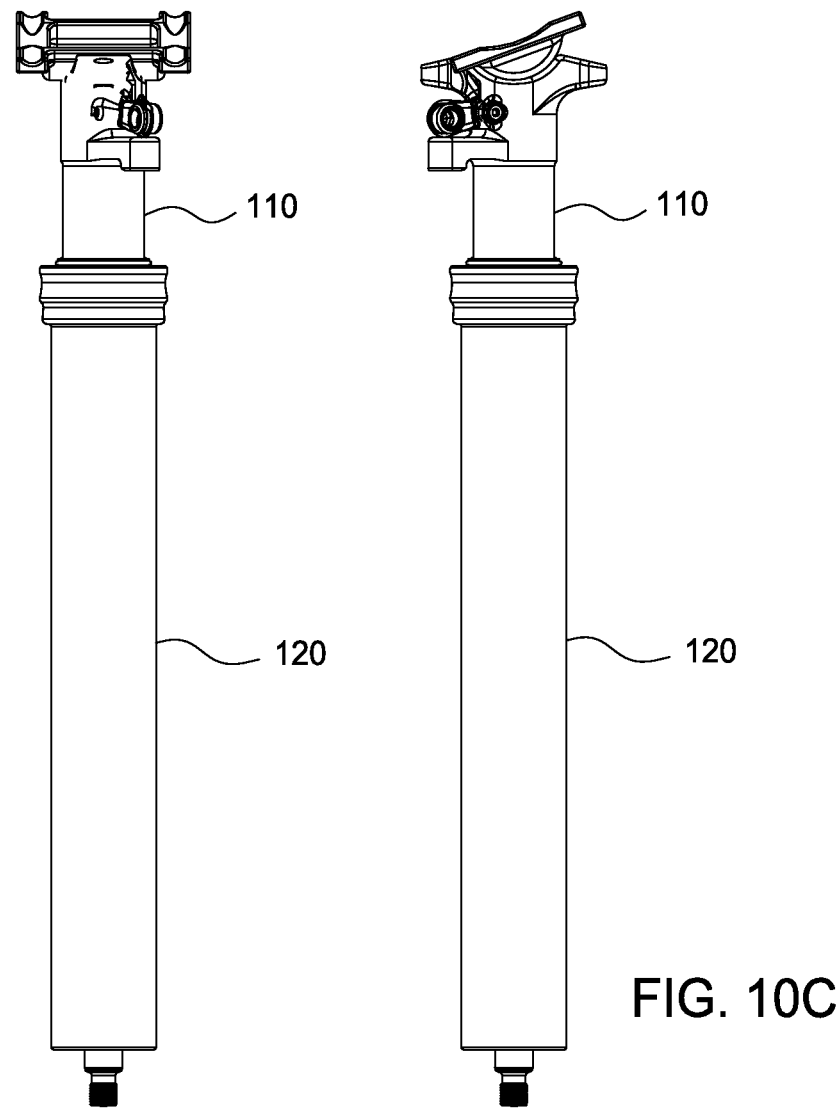
FIG. 10B
FIG. 10C

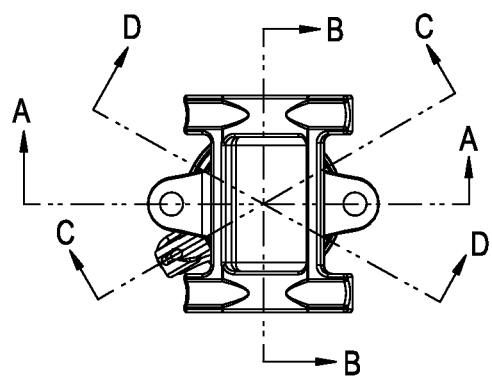
FIG. 11A
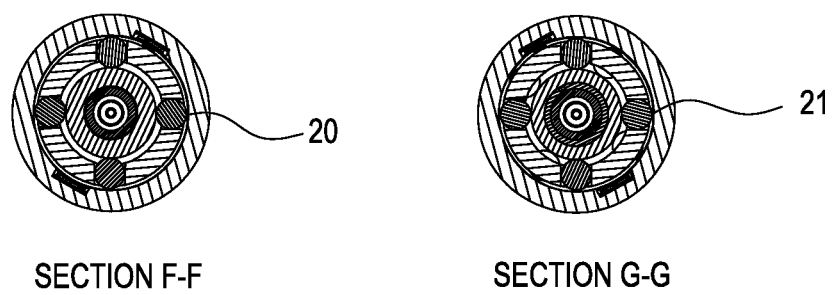
SECTION F-F
FIG. 11F
SECTION G-G
FIG. 11G

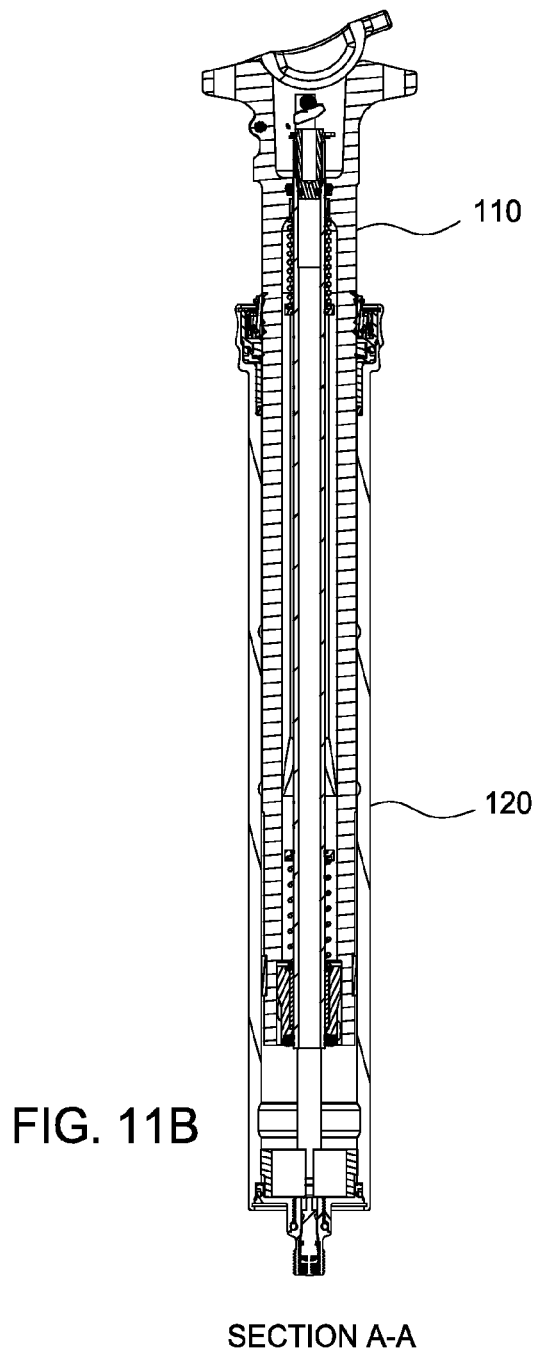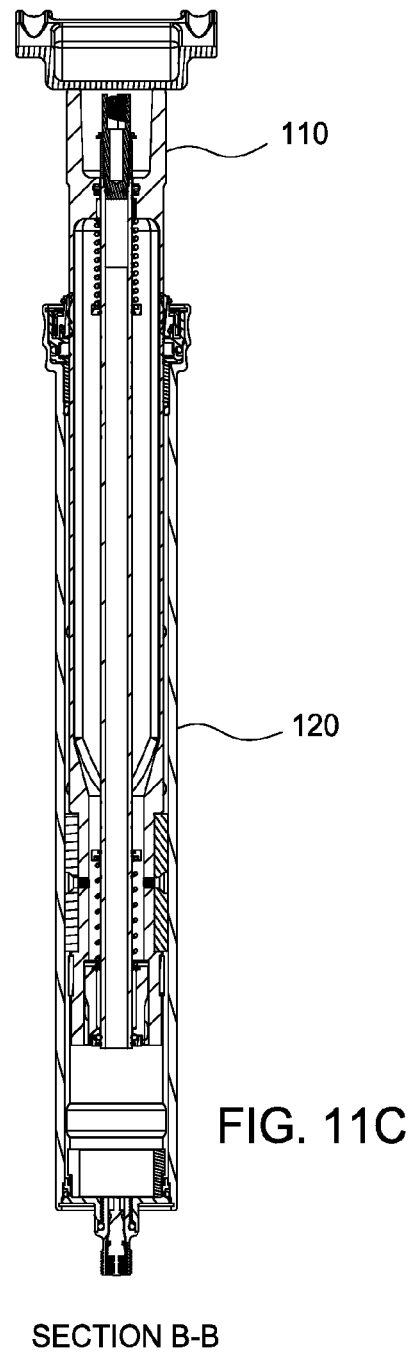
FIG. 11B  SECTION A-A
FIG. 11C  SECTION B-B

FIG. 12A
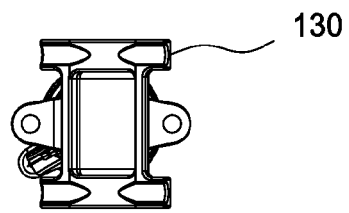
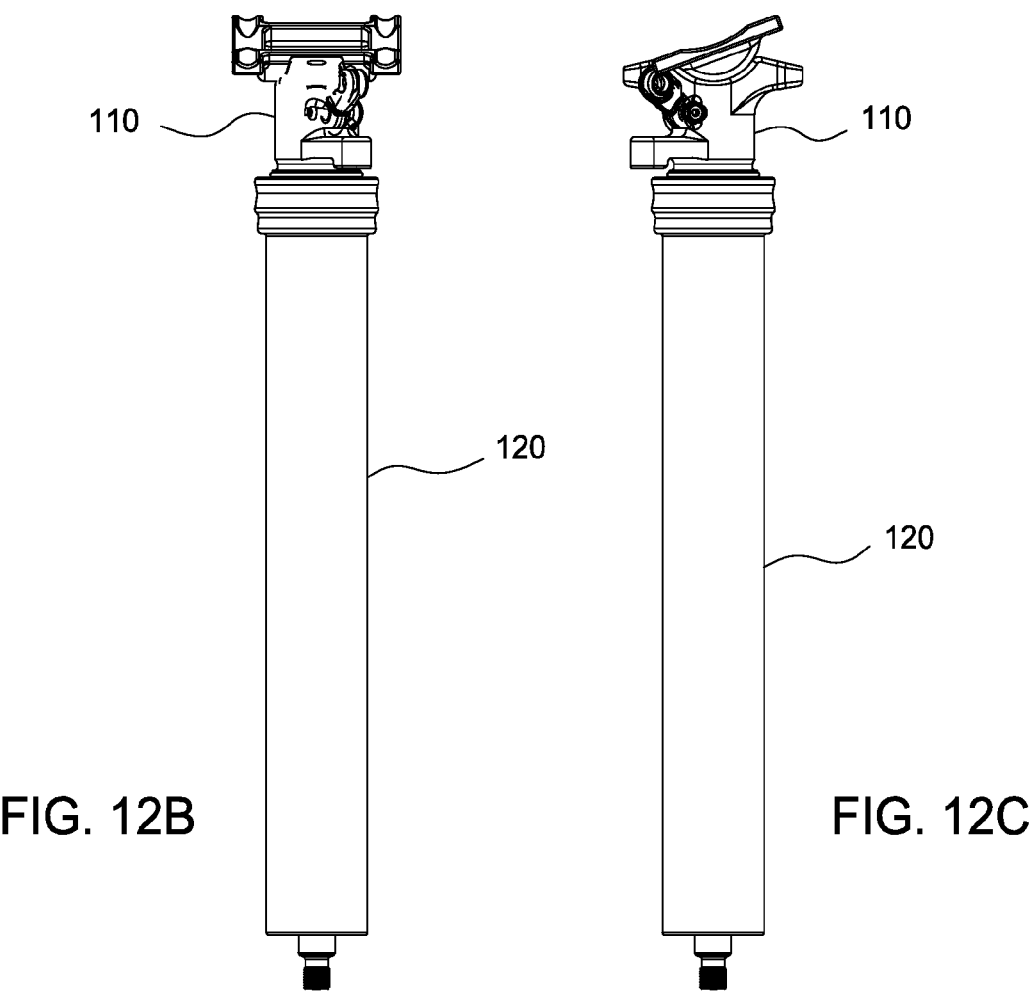
FIG. 12B
FIG. 12C

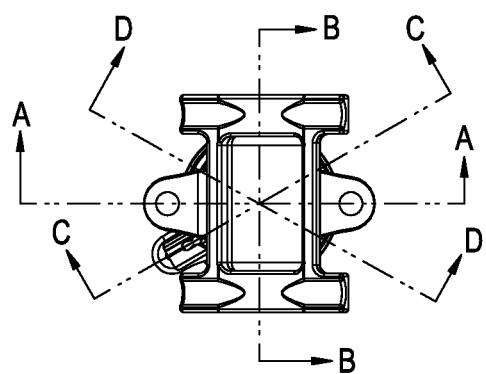
FIG. 13A
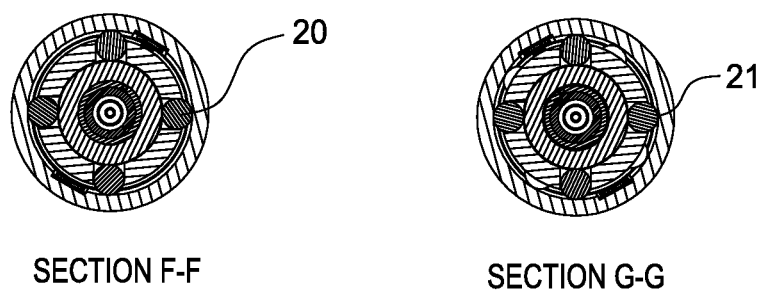
SECTION F-F
SECTION G-G
FIG. 14C
FIG. 14D

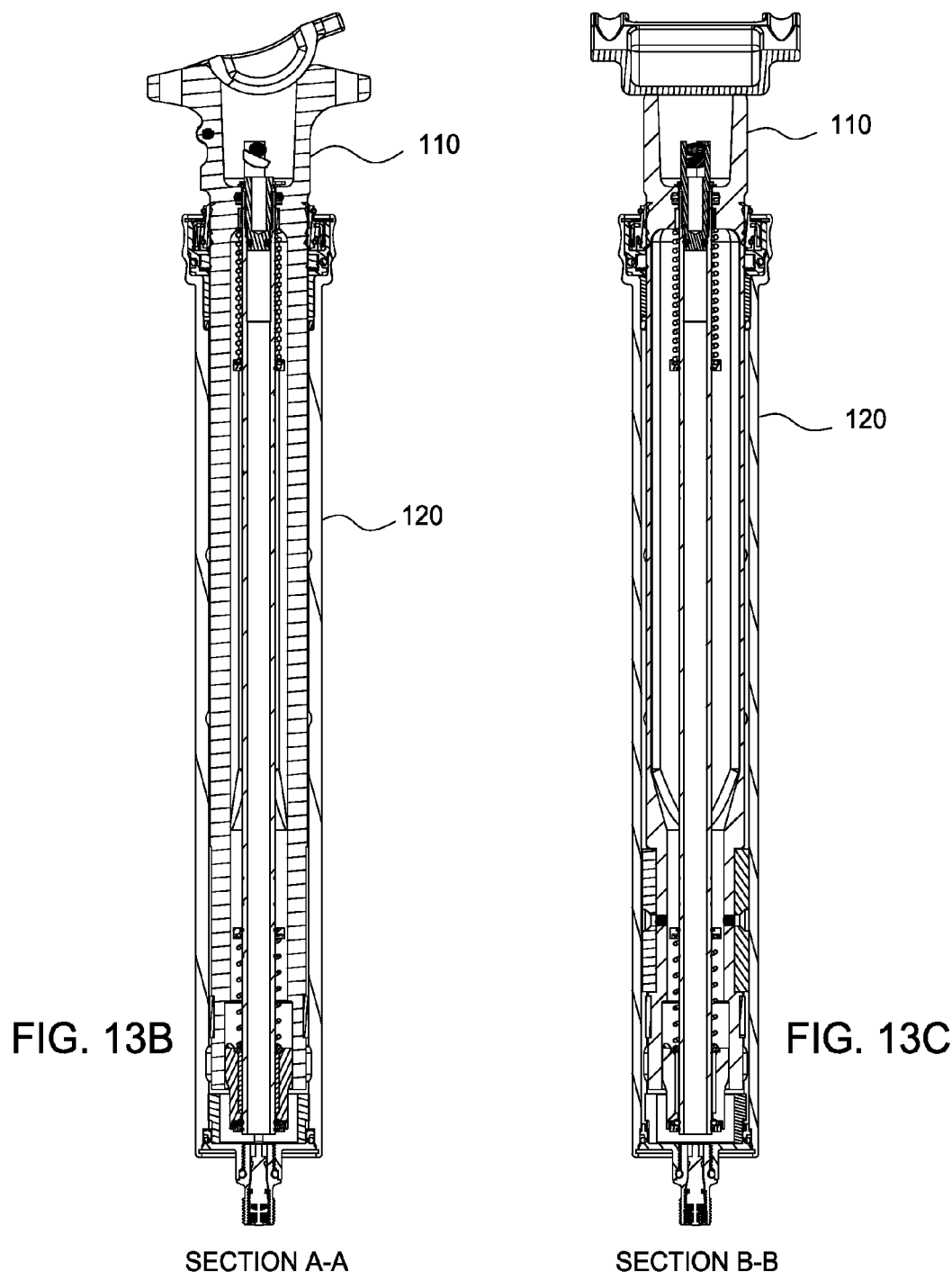
FIG. 13B SECTION A-A
FIG. 13C SECTION B-B

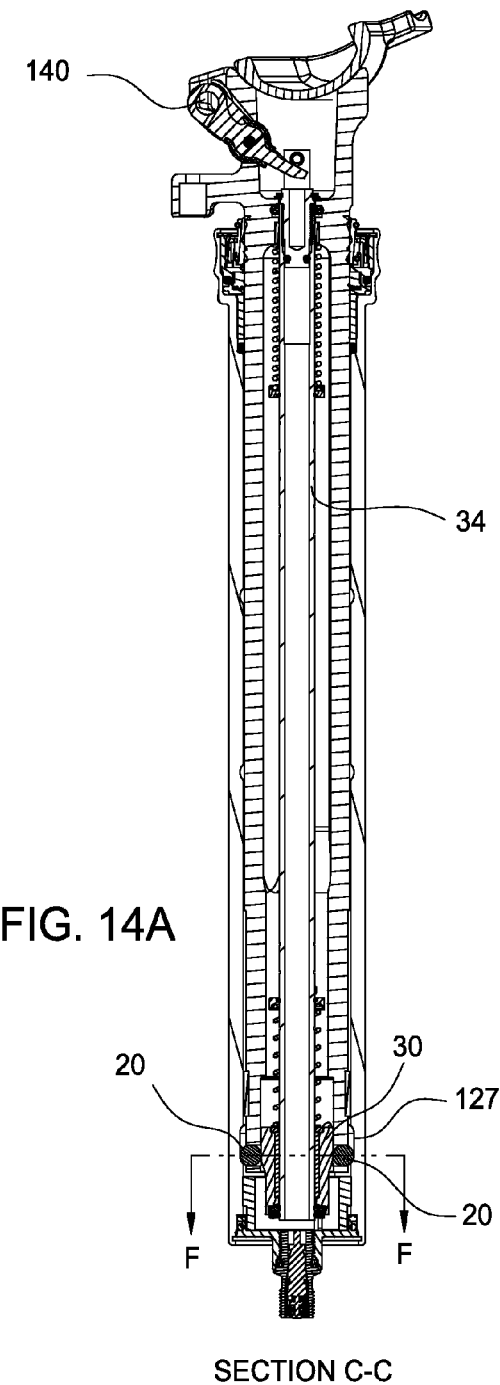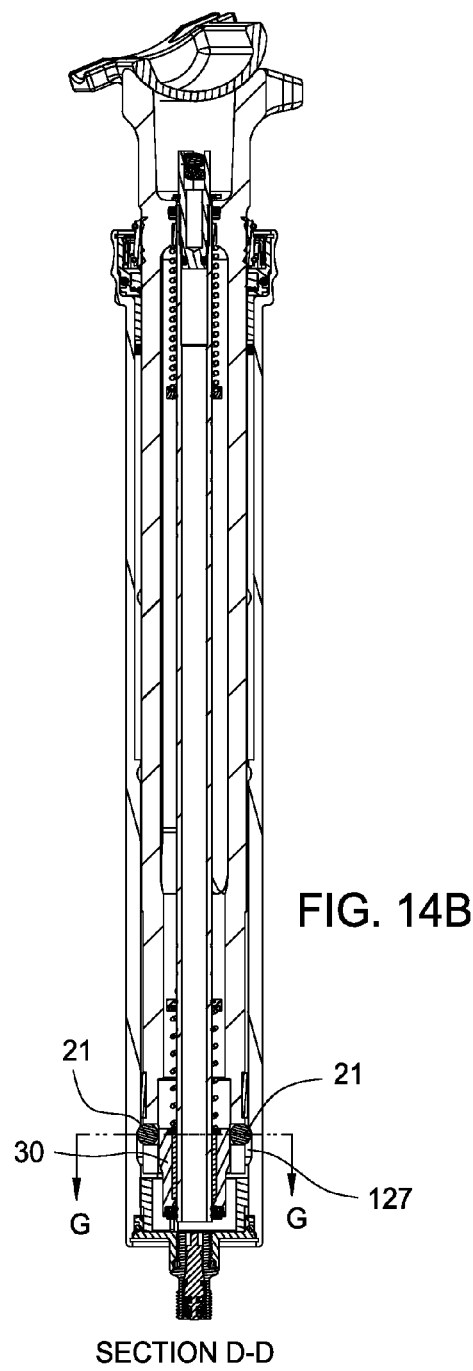
FIG. 14A  SECTION C-C
FIG. 14B  SECTION D-D

SECTION F-F  SECTION G-G

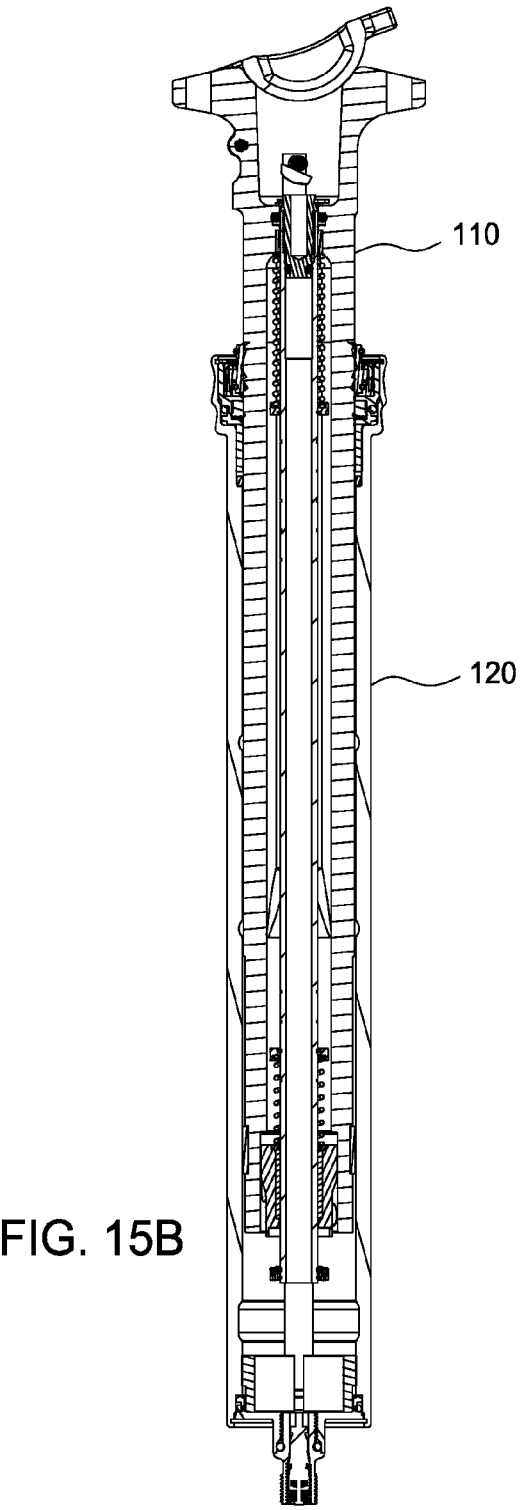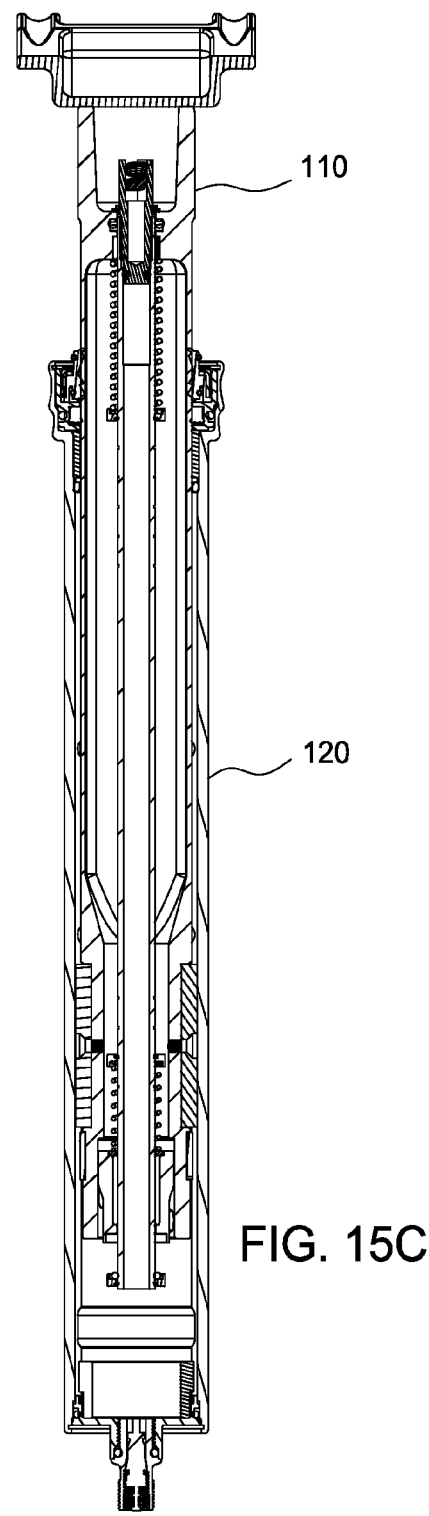
FIG. 15B SECTION A-A
FIG. 15C SECTION B-B

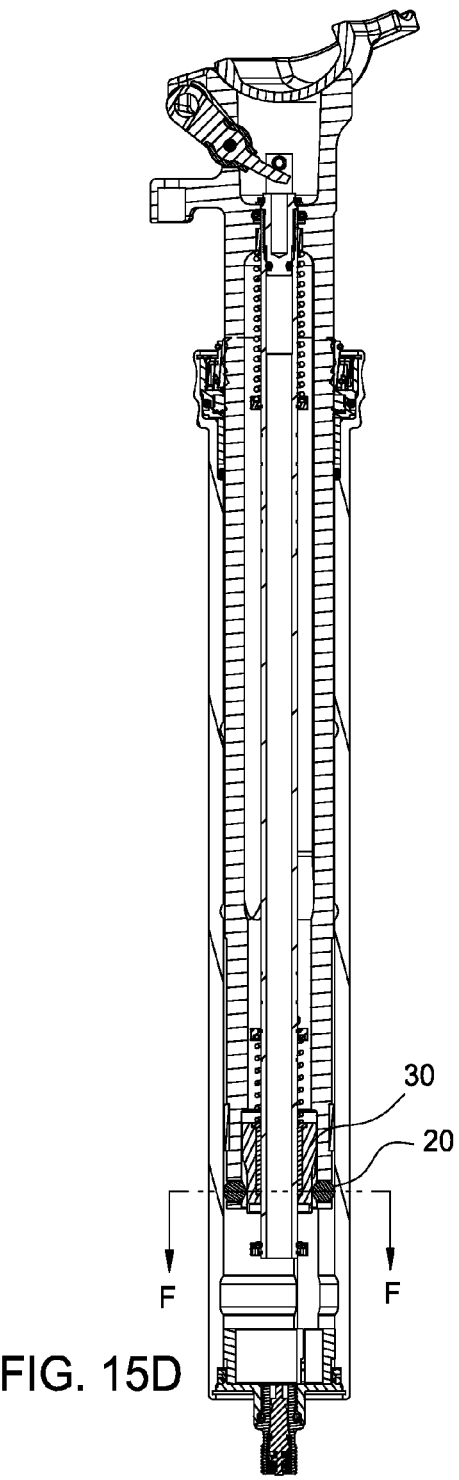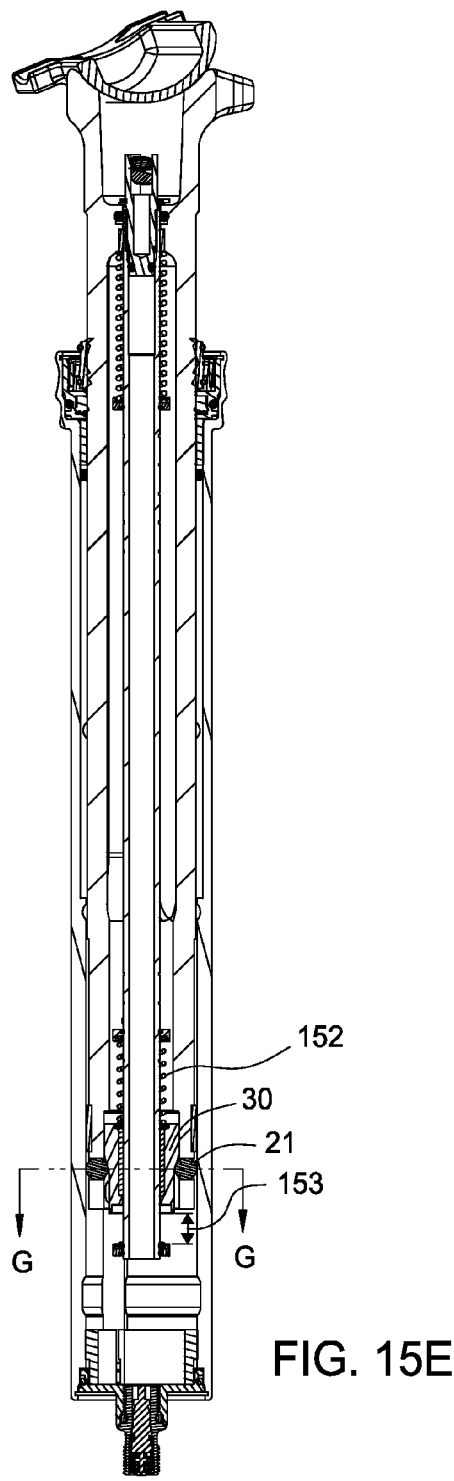
FIG. 15D SECTION C-C
FIG. 15E SECTION D-D

SECTION D-D

SECTION G-G

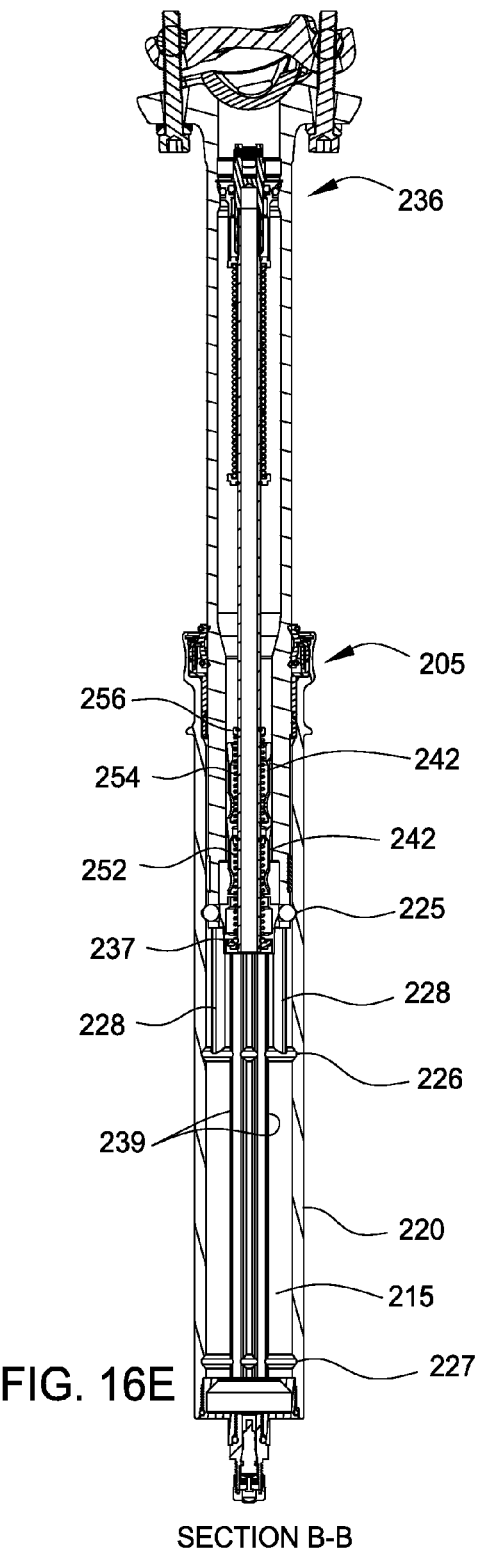

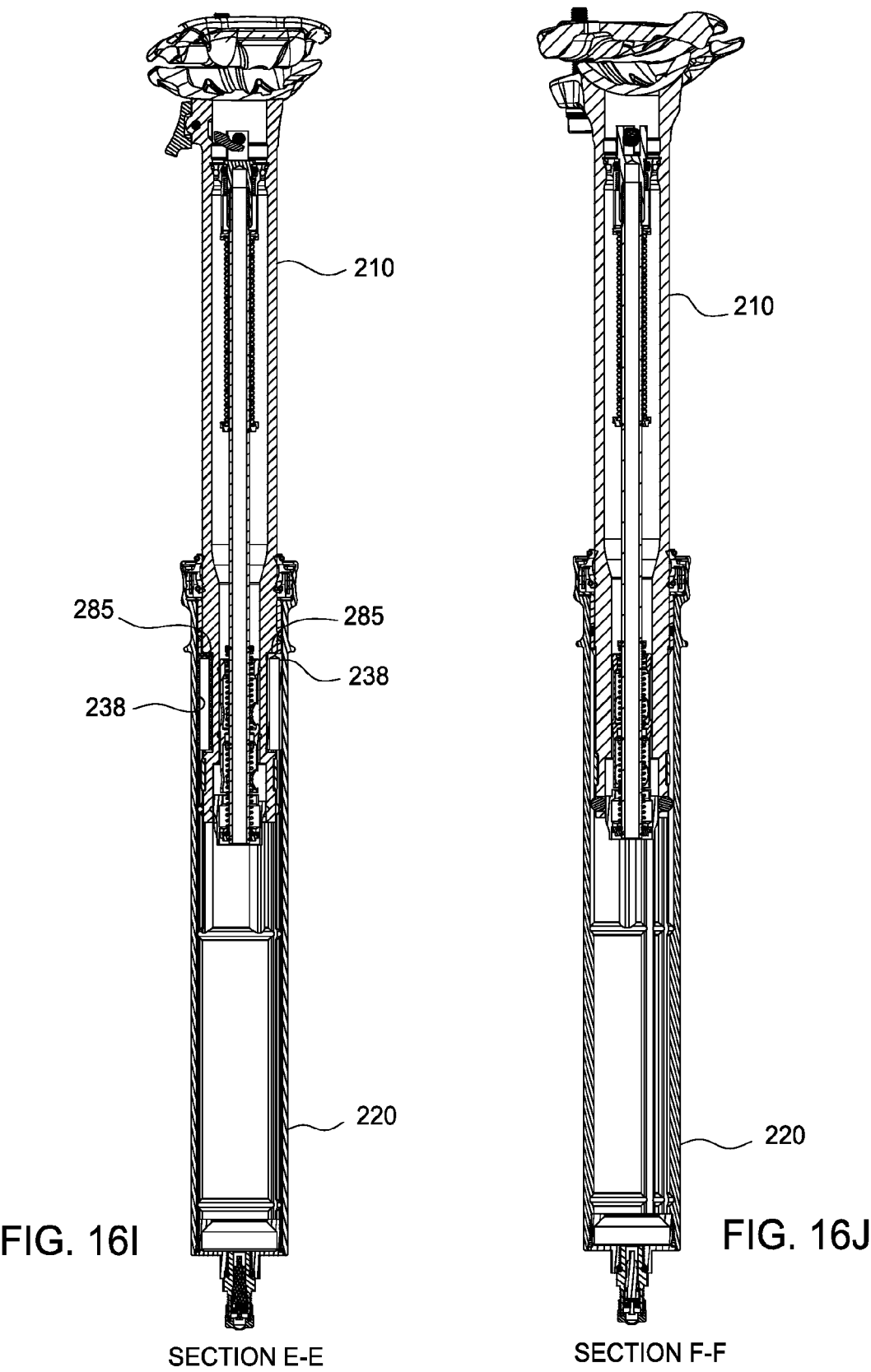

FIG. 17A
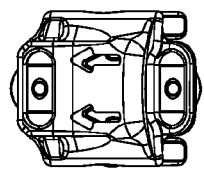
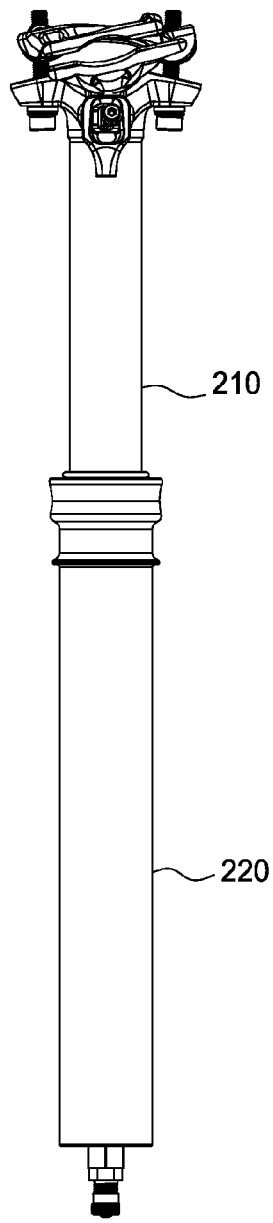
FIG. 17B
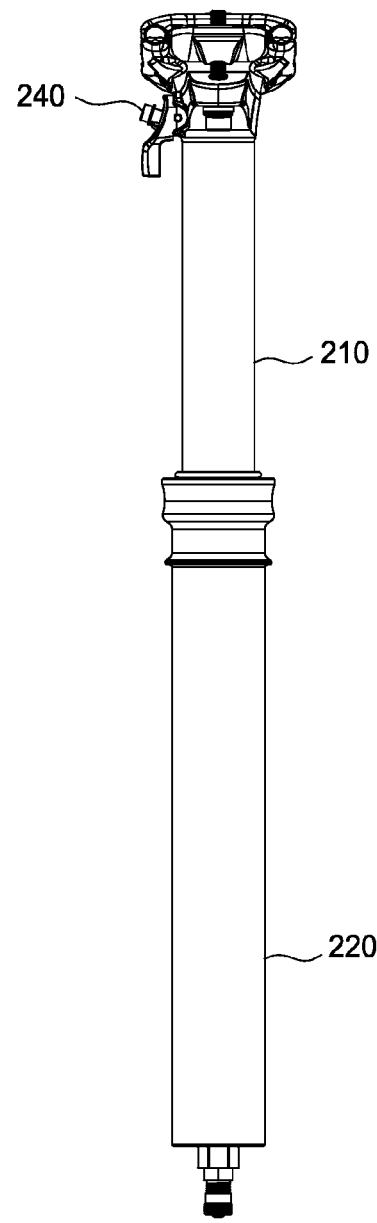
FIG. 17C

SECTION D-D

SECTION G-G

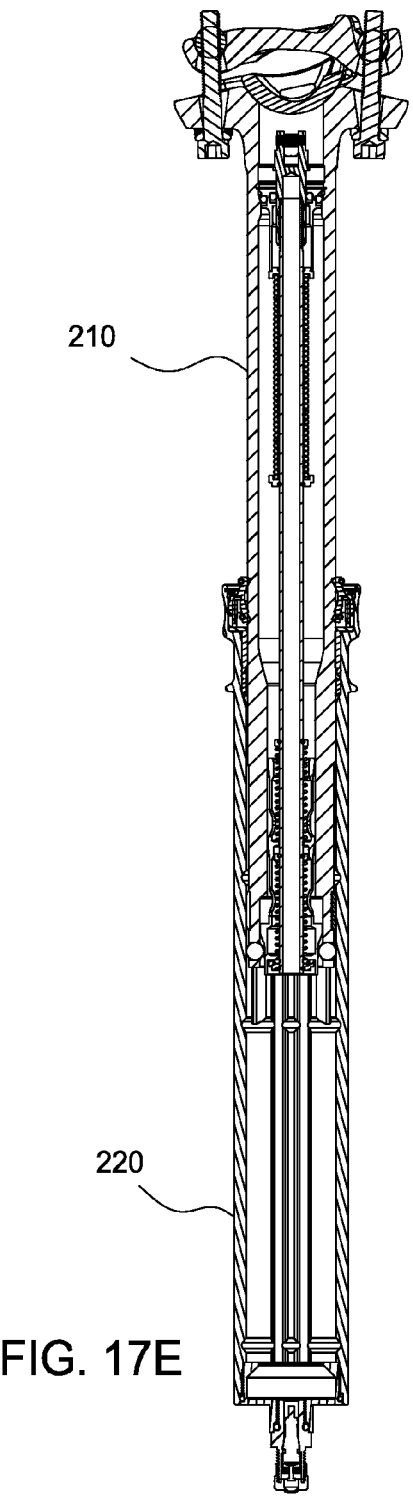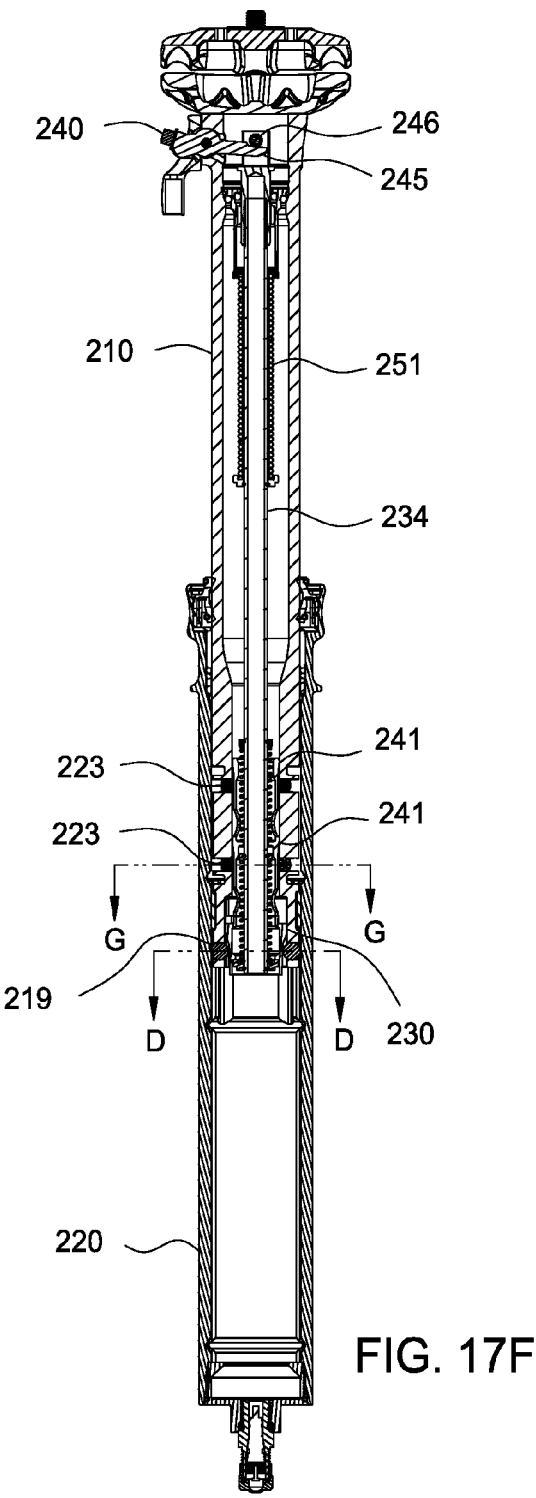
FIG. 17E SECTION B-B
FIG. 17F SECTION A-A

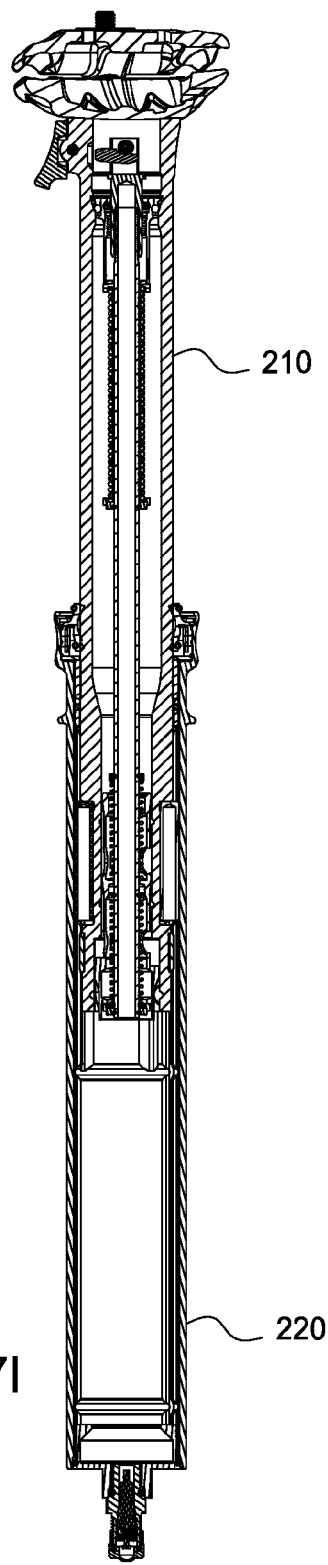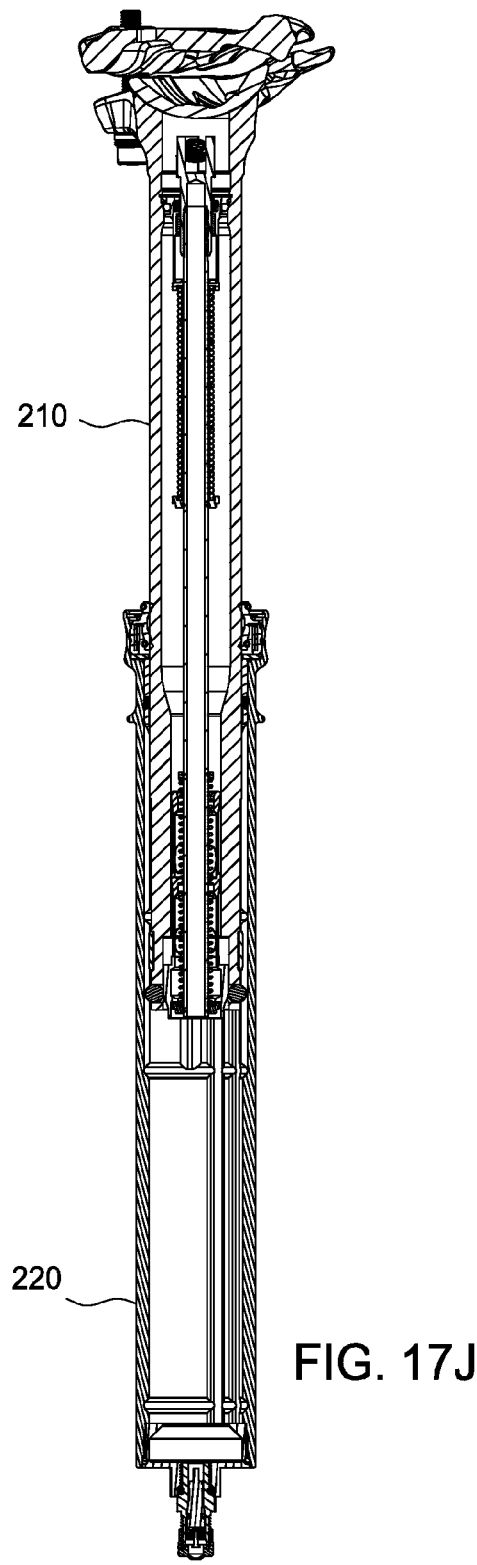
FIG. 17I  SECTION E-E
FIG. 17J  SECTION F-F

FIG. 18A
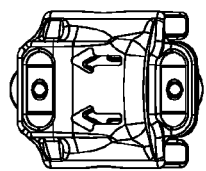
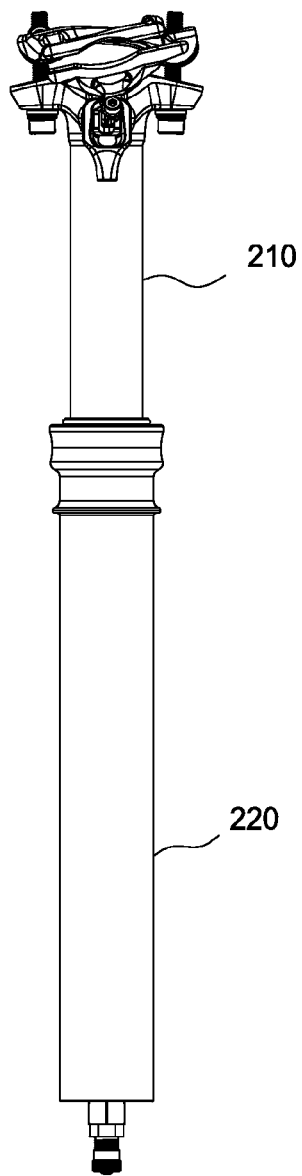
FIG. 18B
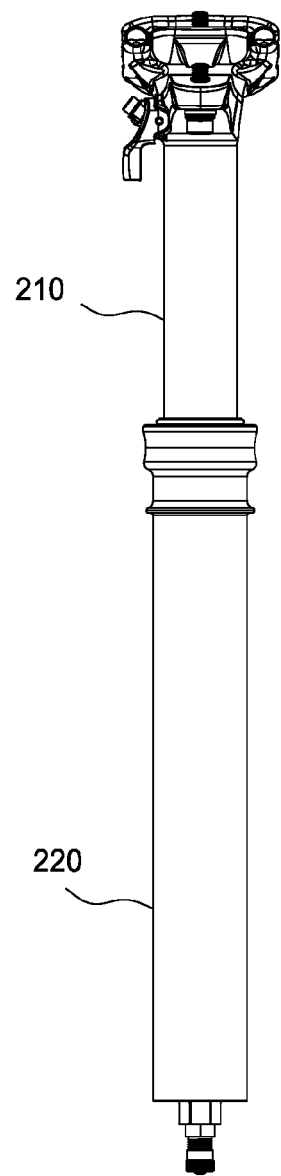
FIG. 18C

SECTION D-D

SECTION G-G

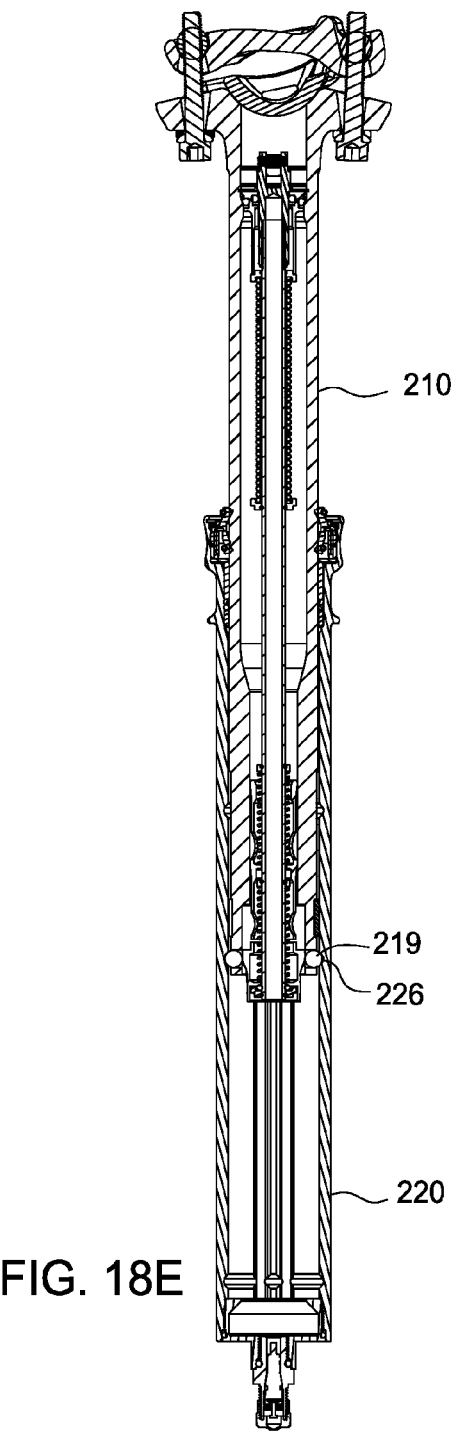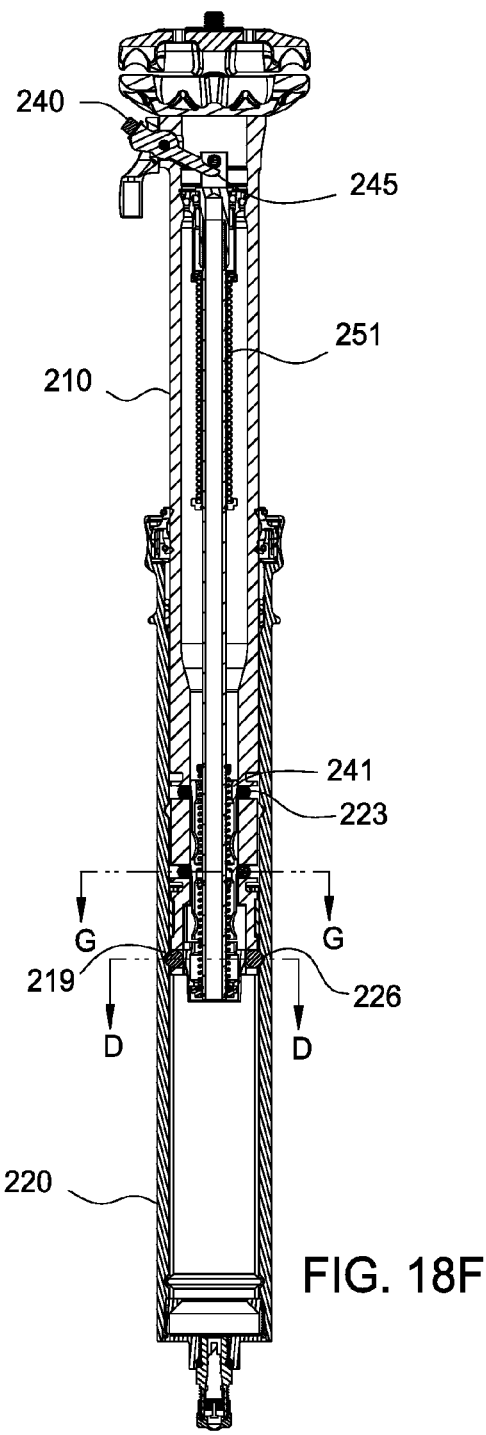
FIG. 18E  SECTION B-B
FIG. 18F  SECTION A-A

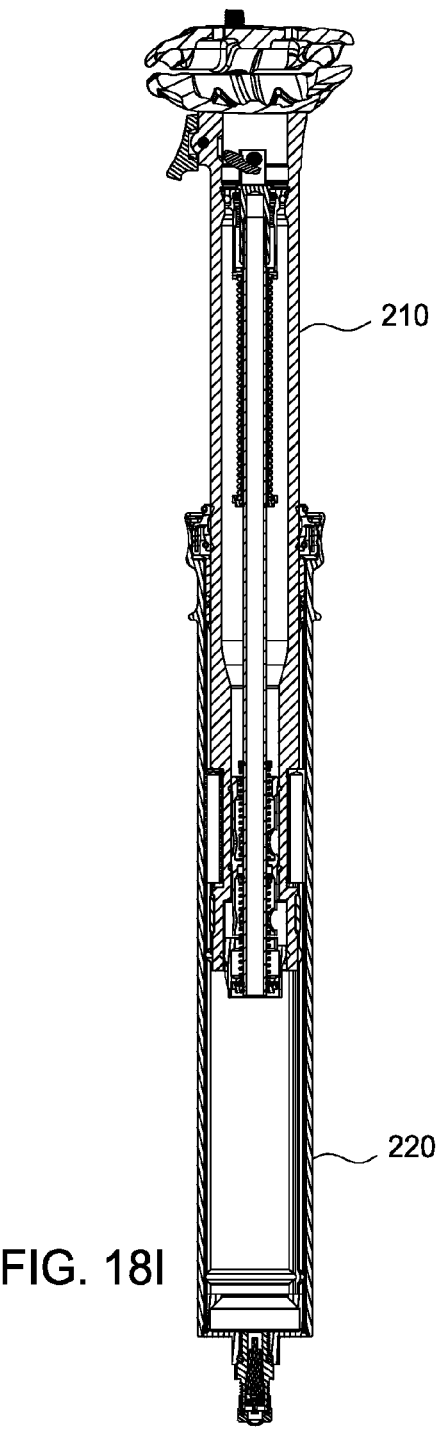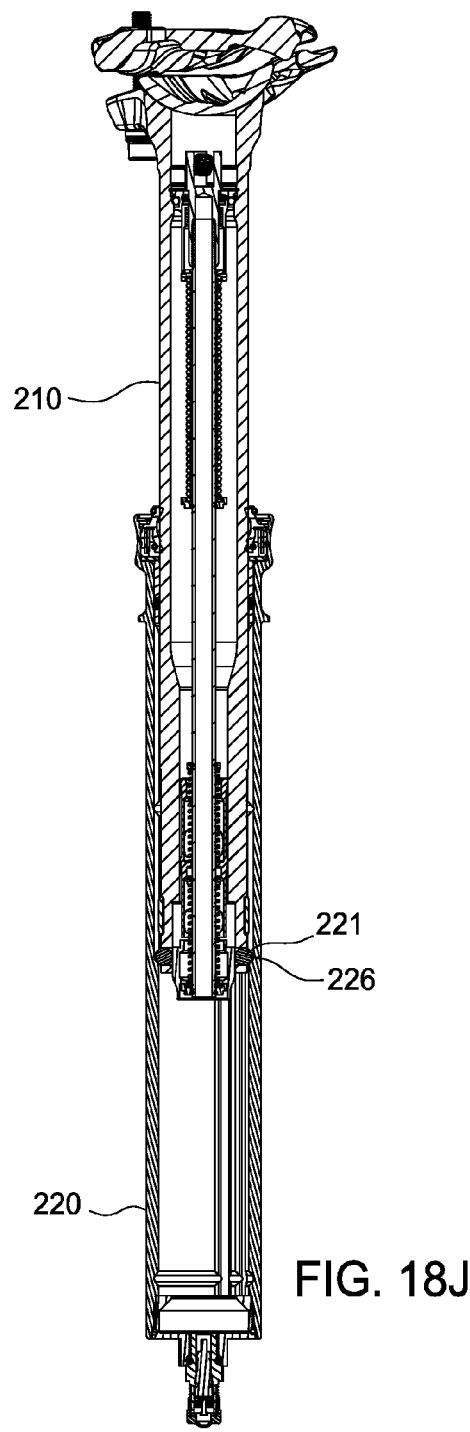
FIG. 18I SECTION E-E
FIG. 18J SECTION F-F

SECTION D-D

SECTION G-G

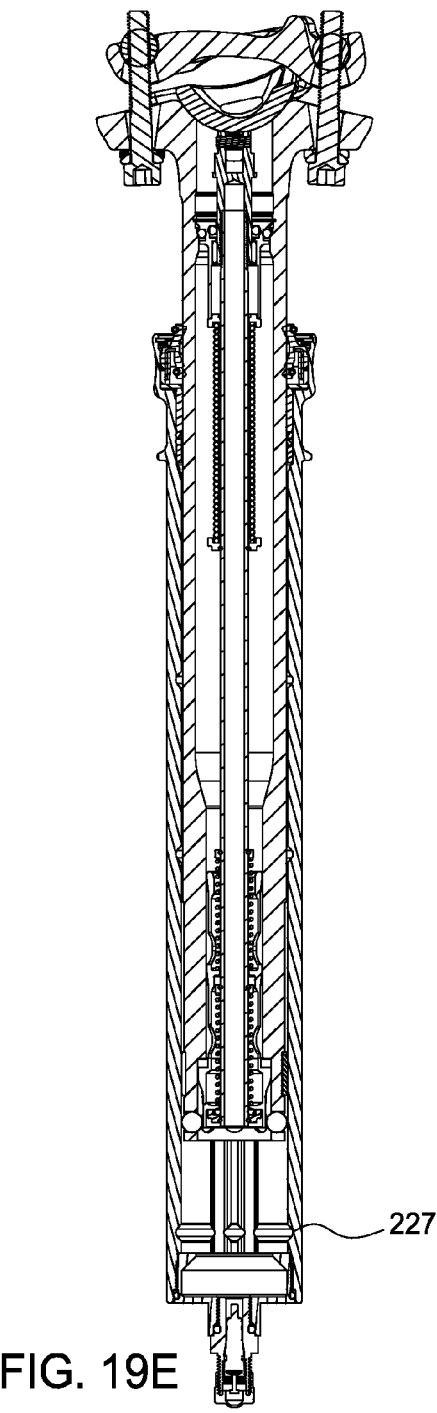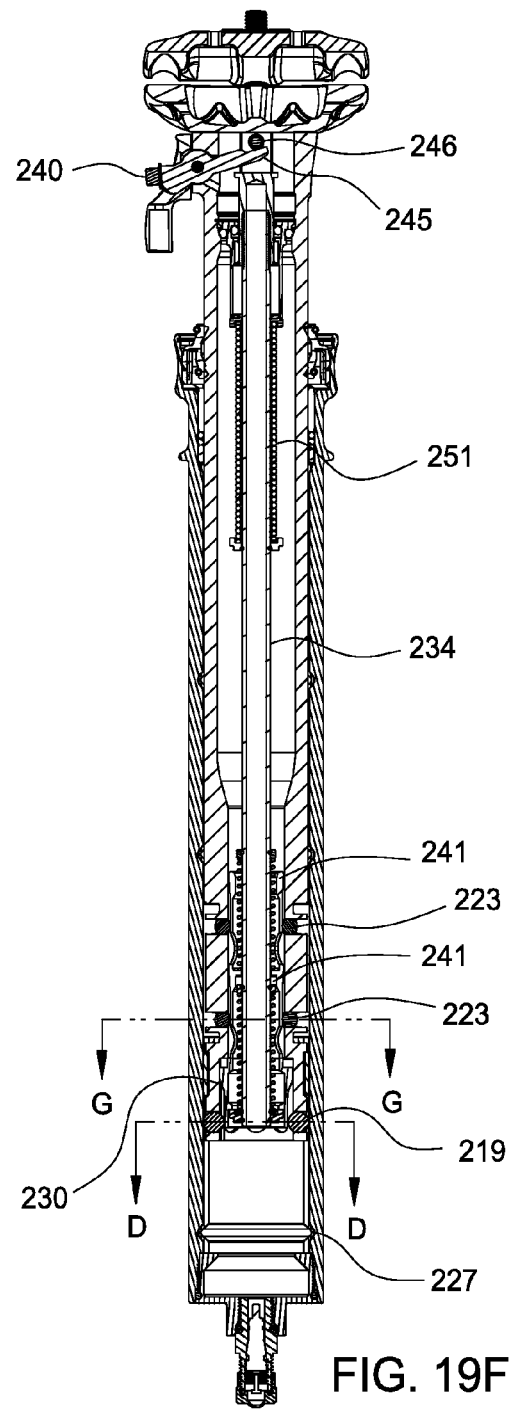
FIG. 19E
SECTION B-B
FIG. 19F
SECTION A-A

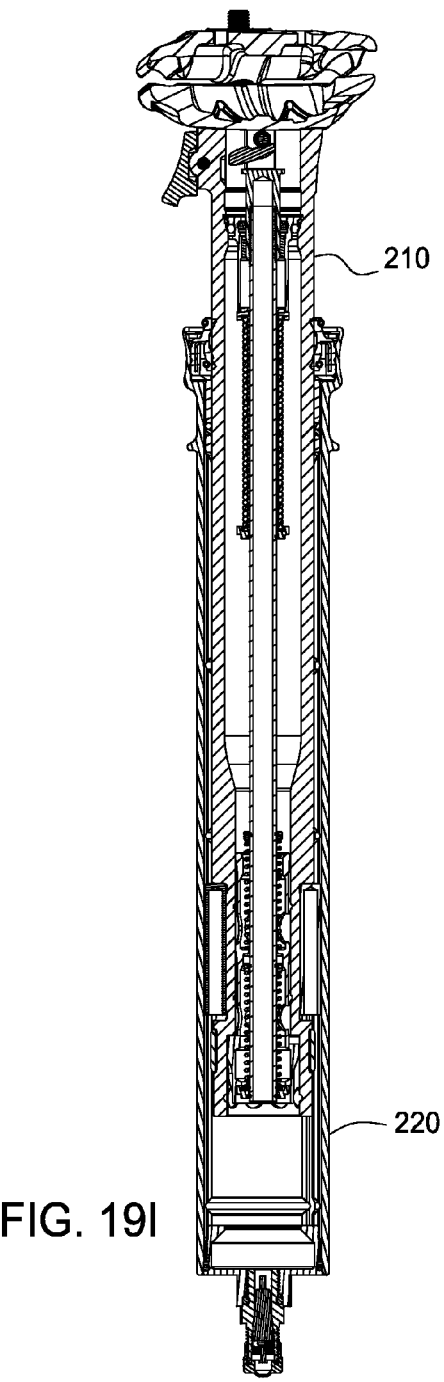
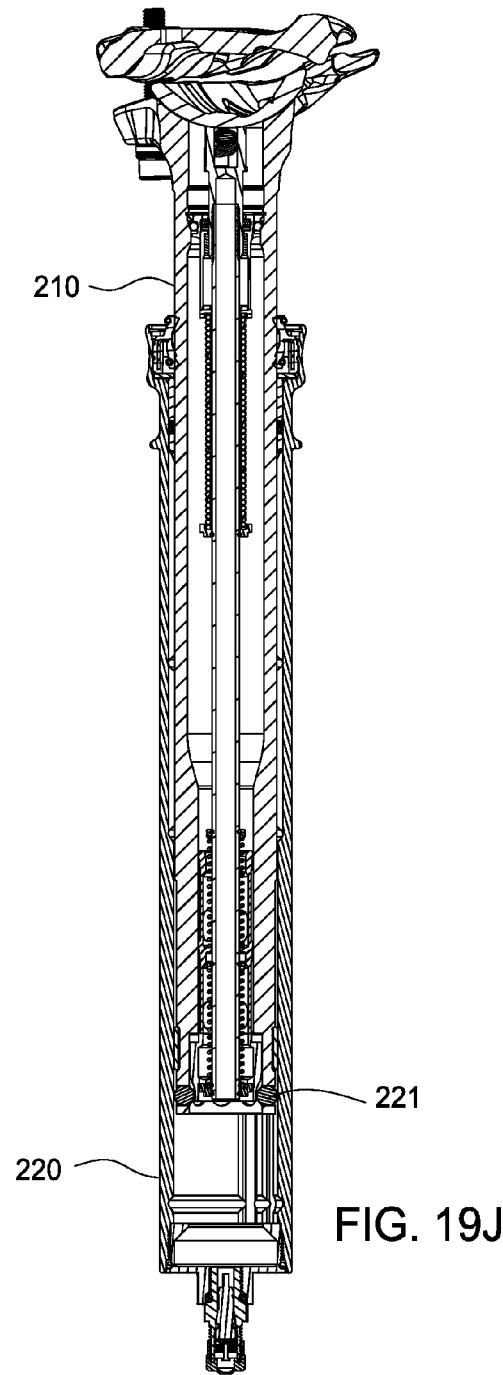
FIG. 19I  SECTION E-E
FIG. 19J  SECTION F-F

SECTION D-D

SECTION G-G

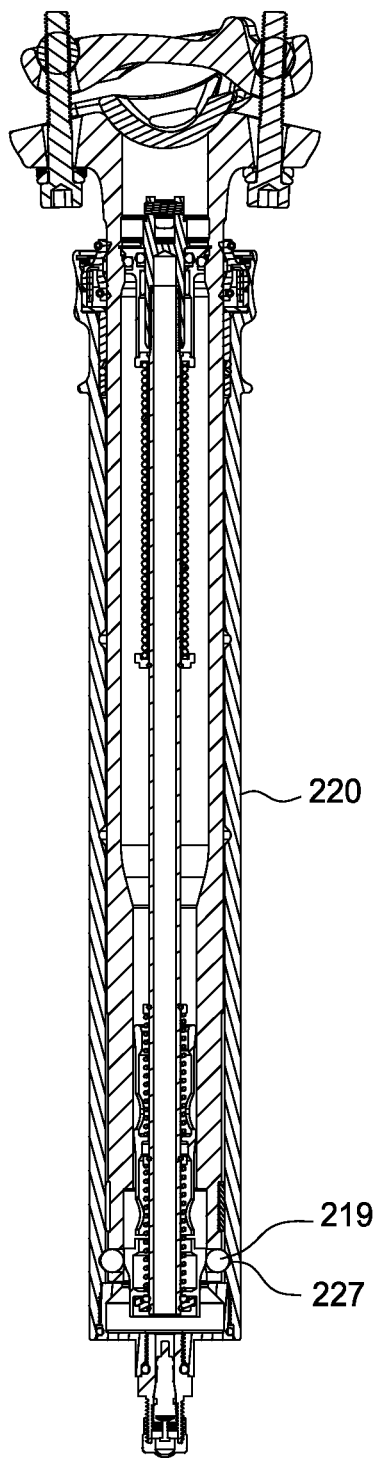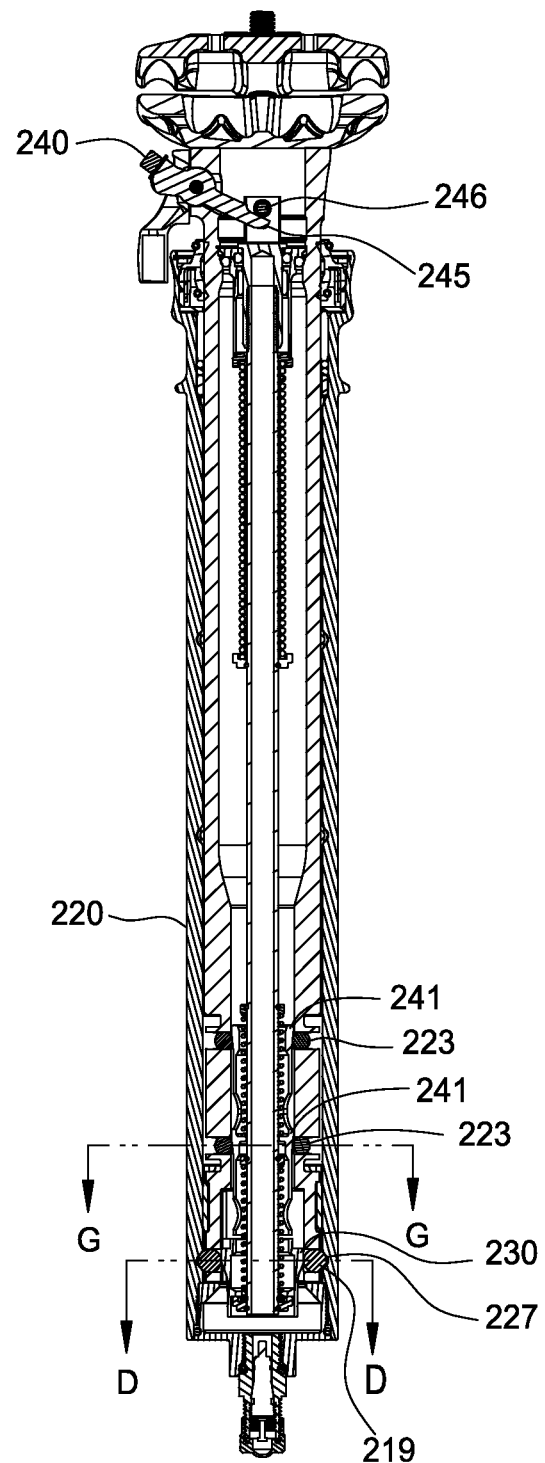
SECTION B-B
SECTION A-A
FIG. 20E
FIG. 20F

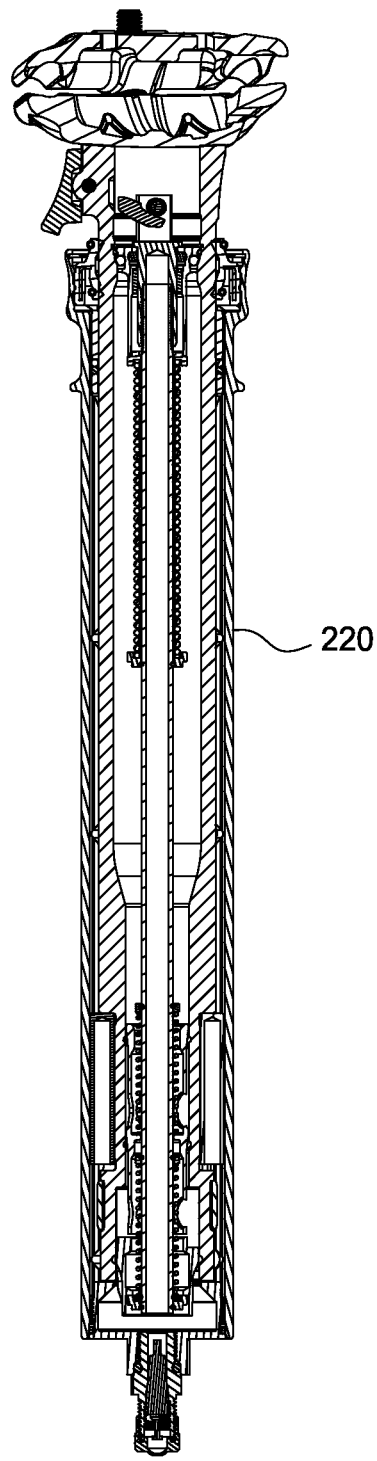
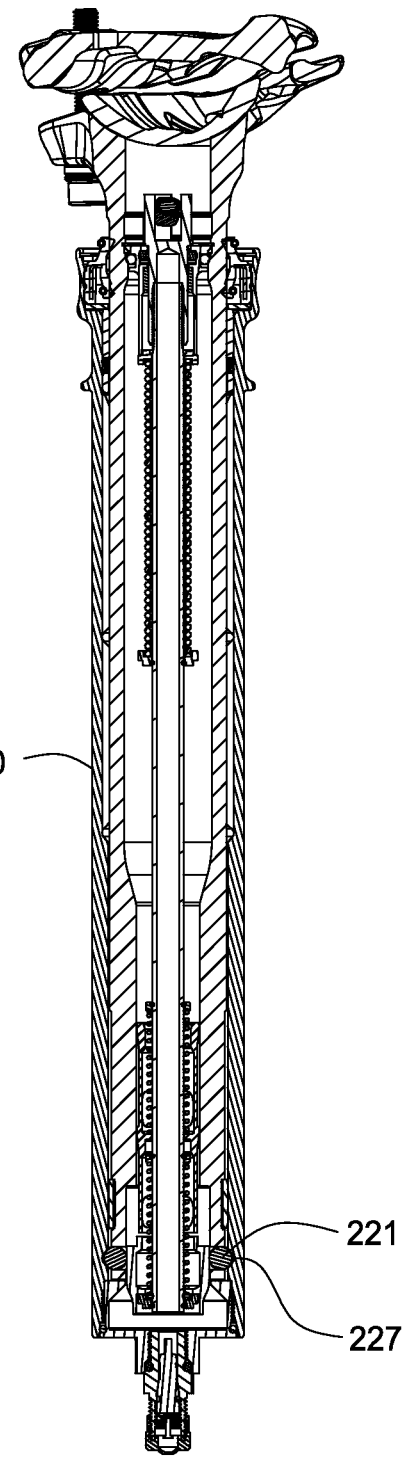
SECTION E-E
SECTION F-F
FIG. 20I
FIG. 20J

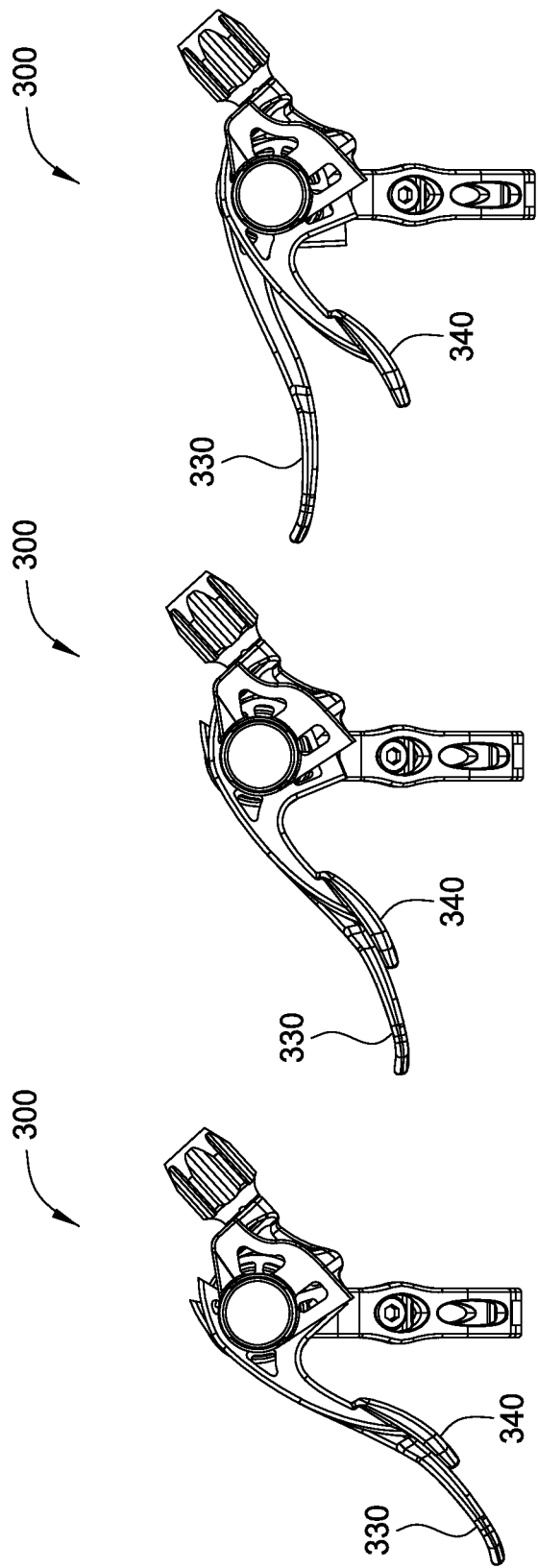

POSITIVE LOCK ADJUSTABLE SEAT POST

CROSS-REFERENCE TO RELATED APPLICATIONS

This application claims benefit of U.S. Provisional Patent Application Ser. No. 61/361,376, filed Jul. 2, 2010, which is herein incorporated by reference in its entirety.

BACKGROUND OF THE INVENTION

1. Field of the Invention

Embodiments of the invention generally relate to a seat support assembly for a vehicle. More specifically, embodiments of the invention relate to a height adjustable seat support. Embodiments of the invention further relate to a height adjustable seat post for a bicycle.

2. Description of the Related Art

Most modern bicycles include a rigid seat post that may be moved relative to the bicycle frame and clamped at a desired height relative to the frame for accommodating different sizes of riders and different rider styles. Generally, adjusting the seat post height in the frame requires that the rider be off the bicycle and/or may requires a significant amount of time and manipulation of the bicycle to achieve the desired seat height.

Therefore, there is a need for new and improved adjustable seat post designs and methods of use.

SUMMARY OF THE INVENTION

In one embodiment, a seat post assembly may comprise an first or outer tube; a second or inner tube axially movable within the outer tube; a locking member coupled to the inner tube and operable to lock the inner tube to the outer tube at a first location and at a second location spaced apart along the axial length of the outer tube; and an actuator operable to secure the locking member into engagement with the outer tube at the first and second locations, and operable to release the locking member from engagement with the outer tube to move the locking member from the first location to the second location.

In one embodiment, a method of adjusting a seat post assembly that has an inner tube axially movable within an outer tube may comprise locking the inner tube to the outer tube at a first location using a locking member that is coupled to the tube; securing the locking member into engagement with the outer tube using an actuator to lock the inner tube to the outer tube; moving the actuator against the bias of a biasing member to release the locking member from engagement with the outer tube at the first location; and moving the inner tube from the first location to a second location after releasing the locking member.

BRIEF DESCRIPTION OF THE DRAWINGS

So that the manner in which the above recited features can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A-3C illustrate an outer tube of the seat post assembly.

FIGS. 4A-4C illustrate the seat post assembly when locked in an extended or upper seat post position.

FIGS. 5A-5H illustrate cross sectional views of the seat post assembly of FIGS. 4A-4C.

FIGS. 6A-6C illustrate the seat post assembly when actuated for movement into an intermediate seat post position.

FIGS. 7A-7H illustrate cross sectional views of the seat post assembly of FIGS. 6A-6C.

FIGS. 9A-9H illustrate cross sectional views of the seat post assembly of FIGS. 8A-8C.

FIGS. 10A-10C illustrate the seat post assembly when actuated for movement into a compressed or lower seat post position.

FIGS. 11A-11G illustrate cross sectional views of the seat post assembly of FIGS. 10A-10C.

FIGS. 12A-12C illustrate the seat post assembly when locked in the compressed or lower seat post position.

FIGS. 13A-13C and 14A-14D illustrate cross sectional views of the seat post assembly of FIGS. 12A-12C.

FIGS. 15A-15G illustrate the seat post assembly prior to being locked in the compressed or lower seat post position.

FIGS. 16A-16J illustrate the seat post assembly when locked in an extended or upper seat post position.

FIGS. 17A-17J illustrate the seat post assembly when actuated for movement into an intermediate seat post position.

FIGS. 18A-18J illustrate the seat post assembly when locked in the intermediate seat post position.

FIGS. 19A-19J illustrate the seat post assembly when actuated for movement into a compressed or lower seat post position.

FIGS. 20A-20J illustrate the seat post assembly when locked in the compressed or lower seat post position.

FIGS. 21A-21E illustrate a lever assembly.

DETAILED DESCRIPTION

Figures 1A, 1B, 1C:
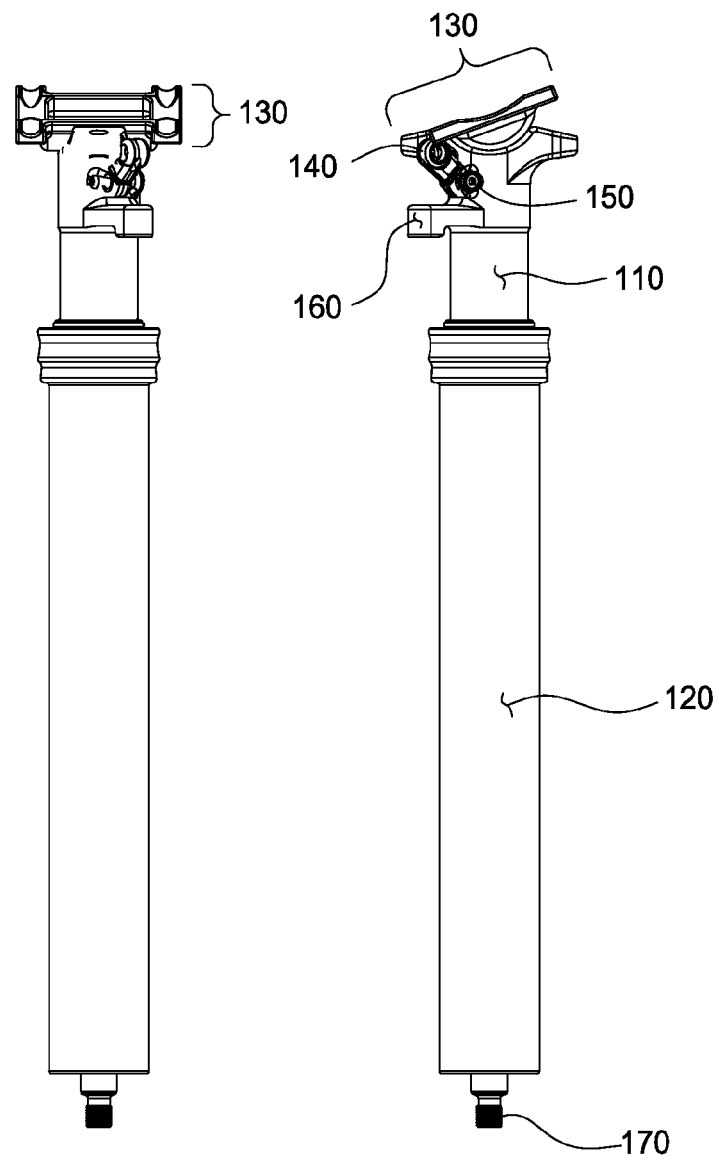
FIGS. 1A-1C illustrate a seat post assembly.
Figures 2A, 2B, 2C, 2D, 2E:
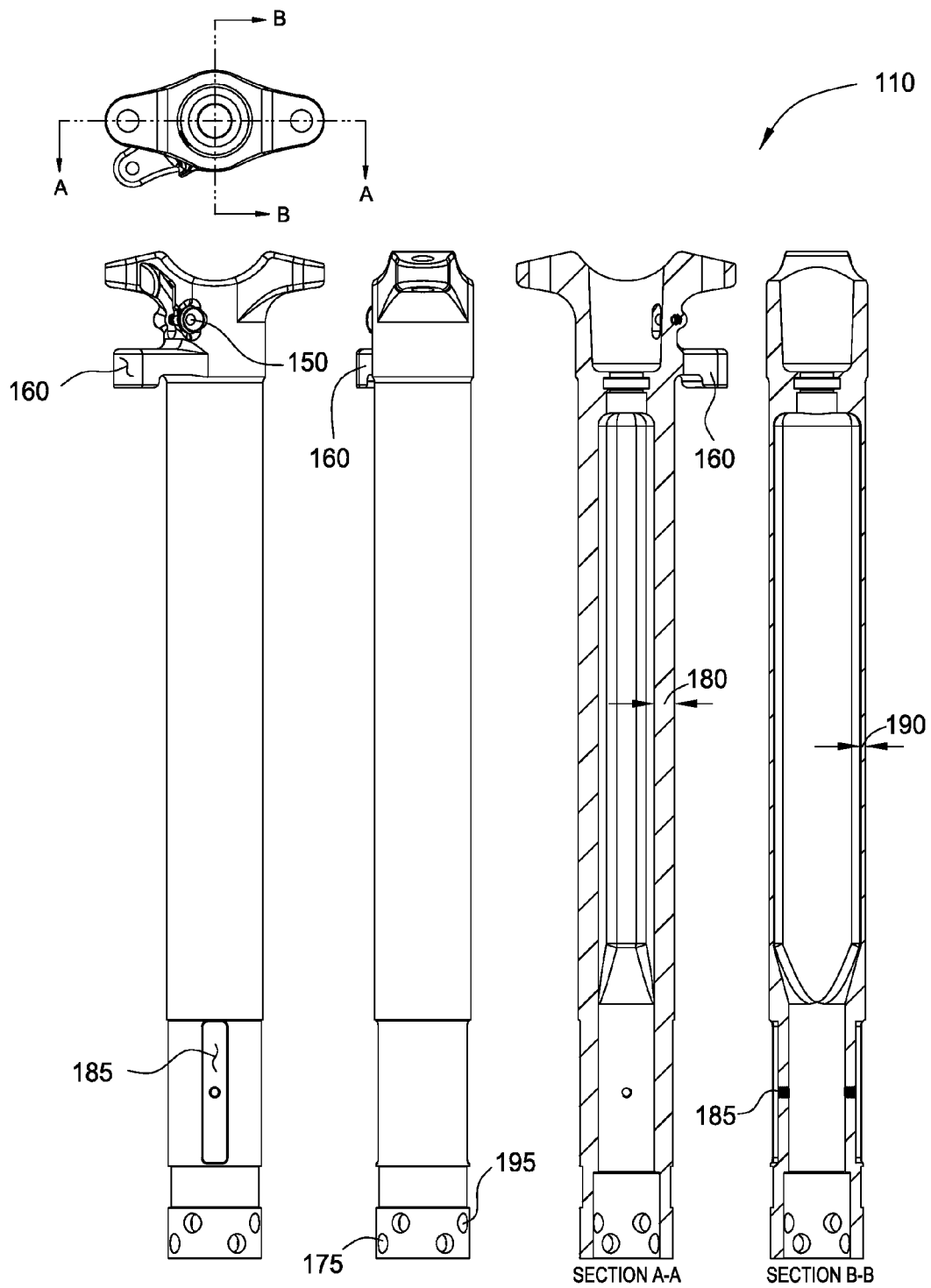
FIGS. 2A-2E illustrate an inner tube of the seat post assembly.
Figure 5A:
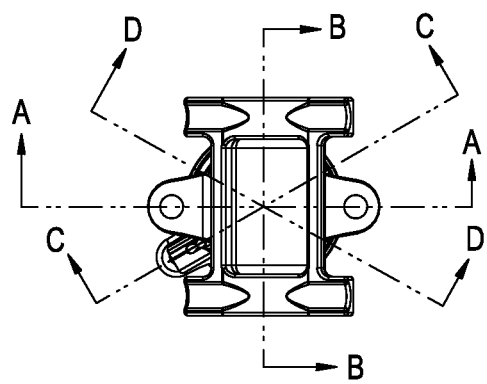
Figure 5D:
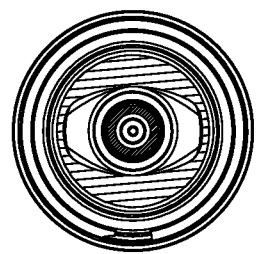
Figure 5G:
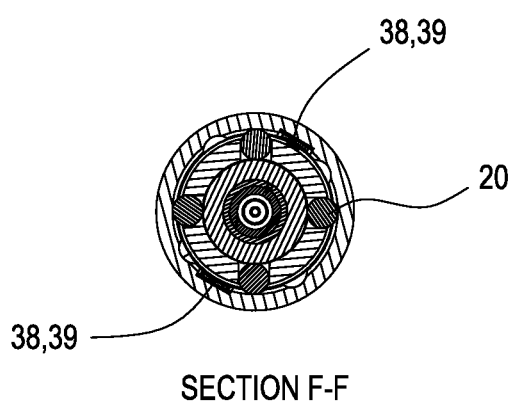
Figure 5H:
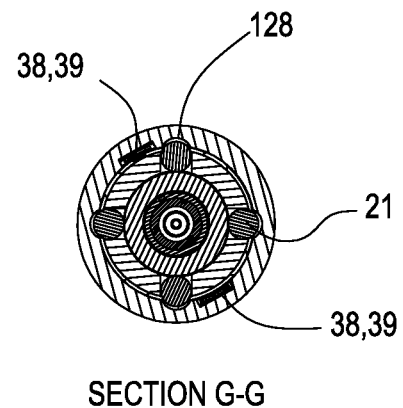

FIGS. 1A-1C illustrate a seat post assembly 100 for a vehicle, such as a bicycle. FIGS. 2A-2E and 3A-3C illustrate an inner tube 110 and an outer tube 120, respectively, of the seat post assembly 100. The seat post assembly 100 includes the inner tube 110 telescopically received within the outer tube 120. An upper end of the inner tube 110 includes a seat retainer 130 for retaining a selected riding saddle or bicycle seat. The inner tube 110 further includes a cable guide 160 and a lever 140 fixed thereto and pivotable about a pin 150 (as will be described in greater detail herein). A lower end of the outer tube 120 includes a fill valve 170, such as a gas fill valve of any suitable type, including for example a Schrader valve or a Presta valve.

In one embodiment, the inner tube 110 includes a thick wall section 180 in a first plane and a thin wall section 190 in a second plane where the result is a substantially oval inner space cross section. The selectively tailored wall section results in adequate strength and reduced overall weight. The lower end of the inner tube 110 includes one or more upper holes 195 and one or more lower holes 175 radially extending through the wall thickness. The upper and lower holes 195, 175 may be axially and/or radially offset relative to each other about the outer diameter of the inner tube 110. A plurality of keyways 185 are also included on an exterior of the inner tube 110 above the upper and lower holes 195, 175.

The outer tube 120 includes an upper snap ring recess 121 and a lower snap ring recess 122 for receiving one or more snap rings. Section A-A as illustrated in FIG. 3B shows some interior features of one embodiment of the outer tube 120, including an upper ball lock recess 125, an intermediate ball lock recess 126, and a lower ball lock recess 127, which correspond to an extended or upper seat post position, an intermediate seat post position, and a compressed or lower seat post position, respectively. Also shown are axial ball tracks 128 for guiding one or more locking members, such as ball members, from the upper seat post position to the intermediate seat post position.

In one embodiment, the inner tube 110 and/or the outer tube 120 may be formed from solid, forged structures. The inner tube 110 and the seat retainer 130 may be formed integrally as a single piece of material. One or more of the other seat post assembly 100 components may be formed integrally with the inner tube 110 and/or the outer tube 120 reduce the number of parts of the assembly. The components of the seat post assembly 100 may be forged as solid, single piece of material structures to optimize wall thicknesses to achieve desired and/or necessary weight and strength.

FIGS. 4A-4C illustrate one embodiment of the seat post assembly 100 locked in the extended or upper seat post position. FIGS. 5A-5H illustrate cross sectional views of the seat post assembly of FIGS. 4A-4C. In all positions, the inner tube 110 is received in the outer tube 120 through a sliding seal head/wiper assembly 5. The seal head/wiper assembly 5 provides a seal and a debris barrier against the relatively smooth (e.g. 32 or 16 rms) outer surface of the inner tube 110. The seal head/wiper assembly 5 may include one or more o-rings or seals for sealing between the inner tube 110 and the outer tube 120, one or more wiper rings for protecting against or occluding debris, and/or one or more snap rings for securing the components within the outer tube 120. The seal head/wiper assembly 5 may also provide a seal for a spring chamber 10 disposed within the outer tube 120.

Referring to FIG. 5E for example, the extended seat post assembly 100 is held in position by one or more ball members 20 that are engaged with the inner tube 110 through the one or more lower holes 175, and the outer tube 120 in the upper ball lock recess 125. The one or more ball members 20 are retained in a radially extended position, corresponding to a locked seat post position, by a large diameter portion 30 of a sleeve 35. The sleeve 35 is coupled to and axially movable with and by an actuator 34, such as a rod member, which retains the sleeve 35 between a biasing member, such as spring 152, and a retainer 37. The sleeve 35 is slidable in relation to the actuator 34 but against compression in the spring 152.

The actuator 34 is axially movable by means of the lever 140, which pivots about the pin 150, and specifically in one embodiment because fork arm 145 engages a roll pin 146 that extends through and to either side of the actuator 34. When the lever 140 is pulled toward the cable guide 160, by a cable installed there through and attached to the lever 140, the fork arm 145 moves in a direction opposite the lever 140 and pulls on the roll pin 146. While one end of the cable passes through the cable guide 160 and attaches to the lever 140, another end of the cable according to one embodiment is attached to and operated by a manual lever having an index system for positively corresponding to the extended or upper, intermediate, and compressed or lower seat post positions. As the roll pin 146 is forced upward, so too is the actuator 34, thereby compressing a biasing member, such as spring 151, which may be positioned between a retainer coupled to the actuator and a shoulder of the inner tube 120. Thus when tension on the cable and corresponding force on the lever 140 is released, the lever 140 and the actuator 34 return to the previous position.

Further, as the actuator 34 is moved upward, so too is the sleeve 35 moved upward, thereby moving the large diameter portion 30 up and out from under the one or more ball members 20. The actuator 34 may extend outside of the sealed spring chamber 10 and is sealed through a chamber bulkhead 36 comprising one or more seals 33, such as o-rings, as shown in FIG. 5F for example, and is held from "falling into" the spring chamber 10 by a stop ring 32. A plurality of keys 38 mounted to the inner tube 110 in the keyways 185 travel in axial slots 39 formed in the outer tube 120 to maintain relative rotational orientation of the inner tube 110 and the outer tube 120 and to maintain axial travel limits of the inner tube 110 within the outer tube 120.

Figure 7A:
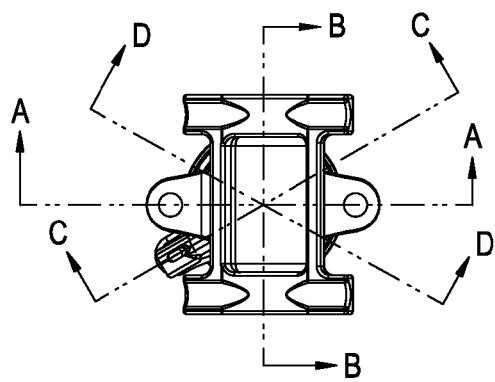
Figure 7D:
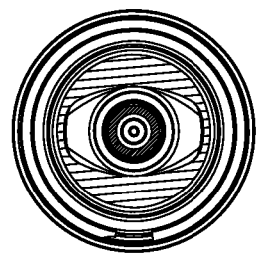
Figure 7G:
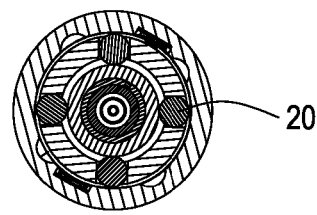
Figure 7H:
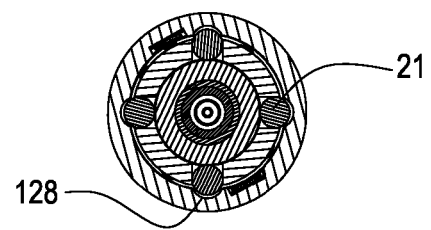

FIGS. 6A-6C illustrate one embodiment of the seat post assembly 100 when actuated for movement into the intermediate seat post position. FIGS. 7A-7H illustrate cross sectional views of the seat post assembly of FIGS. 6A-6C. FIG. 7E shows that the lever 140 has been pulled by a cable for example to an intermediate position, and the fork arm 145 has raised the roll pin 146 and thus the actuator 34 to a position where the large diameter portion 30 of the sleeve 35 is removed from supporting the one or more ball members 20, while the one or more ball members 21 remain supported by the large diameter portion 30. As such, the one or more ball members 20 are free to move from the upper ball lock recess 125 of the outer tube 120, and the one or more ball members 21 are free to travel downward along and within the axial ball tracks 128 of the outer tube 120. A compressive or downward force (e.g. the weight of a rider) must be applied to a saddle or seat mounted on the seat post assembly 100 to cause contraction of the seat post assembly 100 while the actuator 34 is in the intermediate position. This is because a spring gas pressure (e.g. 25 psi or 15 to 50 psi) within the spring chamber 10 exerts a force tending to extend the seat post assembly 100, which is how it is extended when actuated.

Figure 8A:
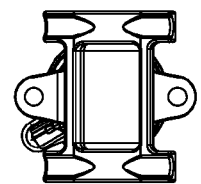
FIGS. 8A-8C illustrate the seat post assembly when locked in the intermediate seat post position.
Figure 8B:
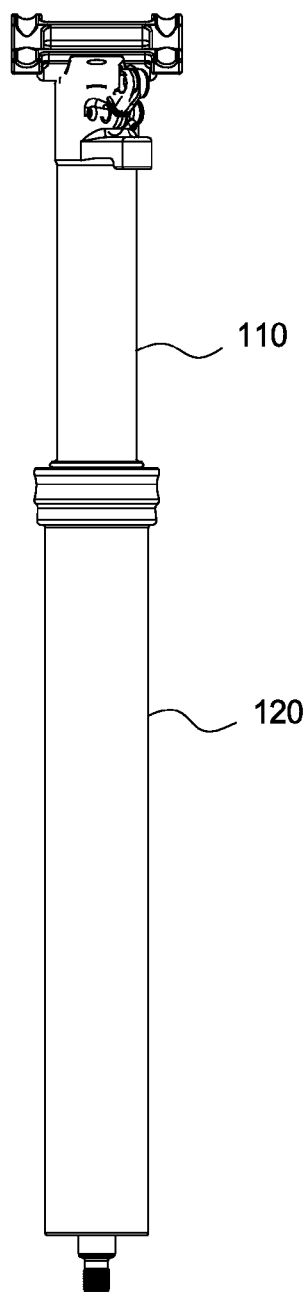
Figure 8C:
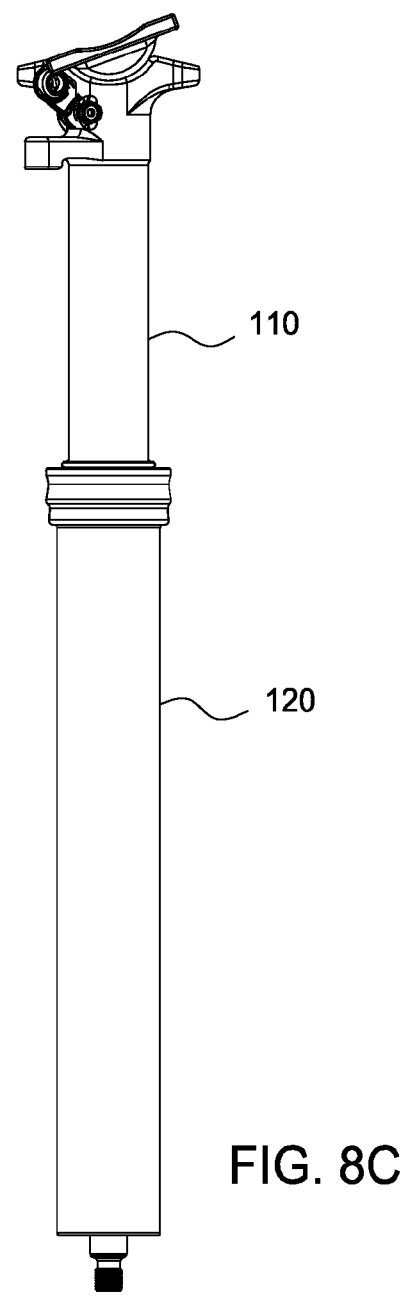
Figure 9A:
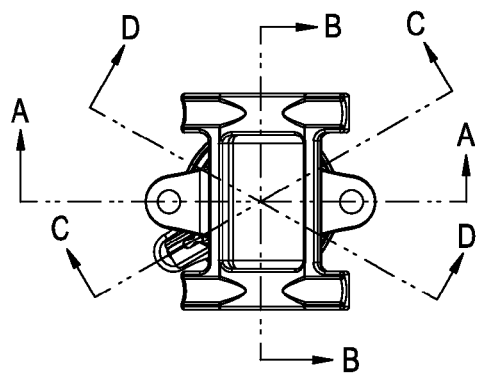
Figure 9D:
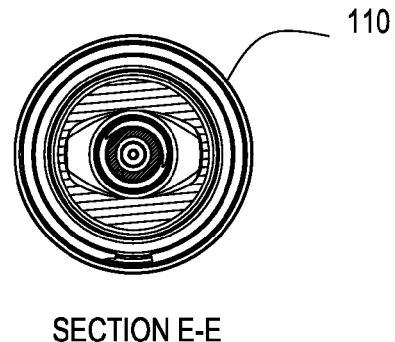
Figure 9G:
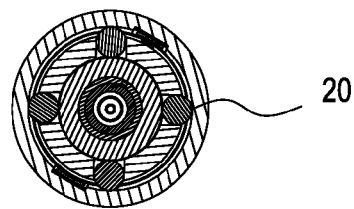
Figure 9H:
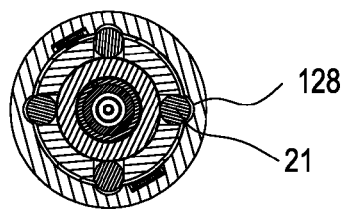

FIGS. 8A-8C illustrate one embodiment of the seat post assembly 100 when locked in the intermediate seat post position. FIGS. 9A-9H illustrate cross sectional views of the seat post assembly of FIGS. 8A-8C. When locked in the intermediate position, the one or more ball members 20 extend into the intermediate ball lock recess 126 and are supported by the large diameter portion 30 of the sleeve 35. The sleeve 35 has been re-positioned with the large diameter portion 30 under or behind both of the one or more ball members 20, 21 because the lever 140 has been released and the compression force of the spring 151 has returned the actuator 34 and the sleeve 35 to the lower position relative to the inner tube 110. The one or more ball members 21 traveled axially downward in the axial ball tracks 128 and abut a shoulder or the ends 129 of the axial ball tracks 128. Such abutment serves as a downward limiter thereby providing a positive location and stop for the intermediate seat post position, so long as the lever 140 and the actuator 34 are initially positioned for intermediate travel only. According to one embodiment, the intermediate seat post position cannot be passed while compressing the seat post assembly 100 so long as the lever 140 is positioned for intermediate travel (e.g. when an operating lever is for example indexed in the intermediate travel mode). When the one or more ball members 21 are abutting the shoulder or the ends 129 of the axial ball tracks 128, the one or more ball members 20 are aligned with the intermediate ball locking recess 126.

Figure 11D:
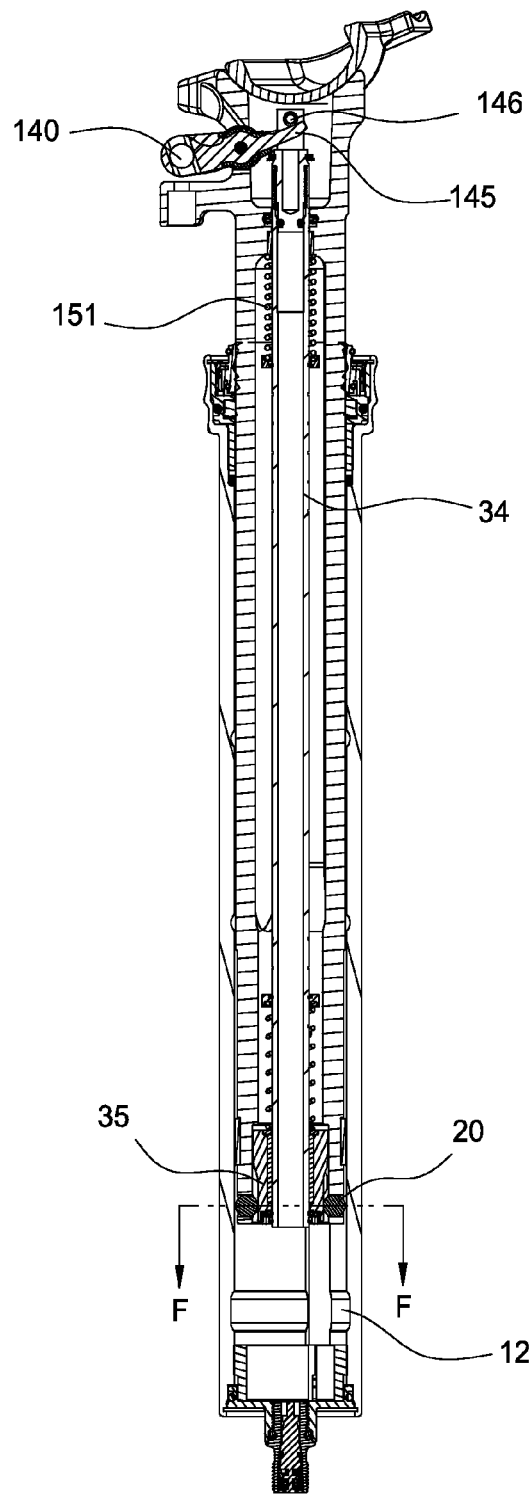
Figure 11E:
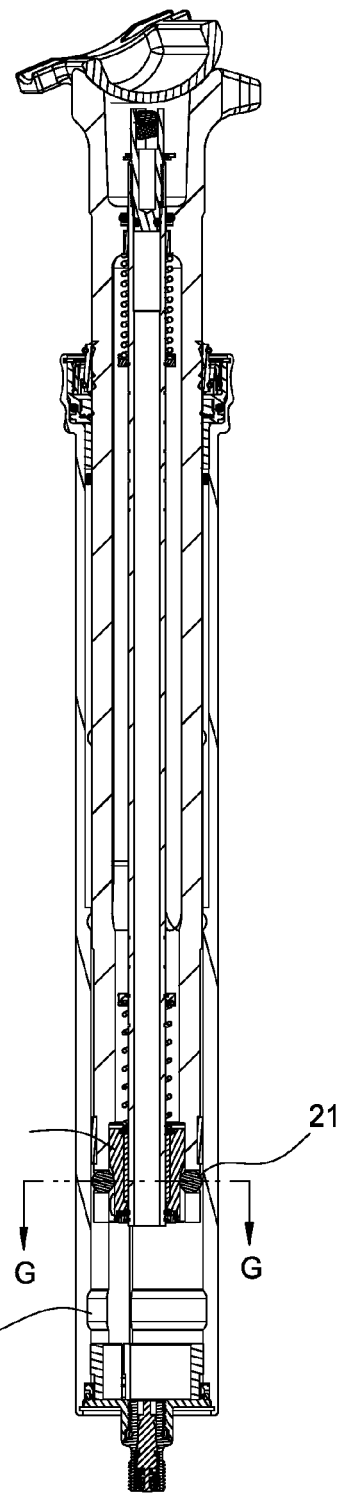

FIGS. 10A-10C illustrate one embodiment of the seat post assembly 100 when actuated for movement into the compressed or lower seat post position. FIGS. 11A-11G illustrate cross sectional views of the seat post assembly of FIGS. 10A-10C. FIG. 11D shows the lever 140 actuated to full travel whereby the spring 151 is correspondingly compressed, the large diameter portion 30 of the sleeve 35 is removed from beneath or behind both of the one or more ball members 20, 21, and the inner tube 110 is traveling downward within the outer tube 120 by virtue of applied rider weight and while compressing gas in the spring chamber 10. When the large diameter portion 30 of the sleeve 35 moved from beneath or behind the one or more ball members 20, 21, this allows the one or more ball members 20 to retract from engagement with the intermediate ball locking recess 126, and allows the one or more ball members 21 to retract from engagement with the shoulder or ends 129 of the axial ball tacks 128 to enable the inner tube 110 to move to the compressed or lower seat post position using applied rider weight to the inner tube 110.

FIGS. 12A-12C illustrate one embodiment of the seat post assembly 100 when locked in the compressed or lower seat post position. FIGS. 13A-13C and 14A-14D illustrate cross sectional views of the seat post assembly of FIGS. 12A-12C. FIGS. 13B and 14B illustrate the inner tube 110 fully compressed into the outer tube 120, and the seat post assembly 100 locked in its lowest position. The lever 140 has been released and the spring 151 has returned the actuator 34 relatively downward and the large diameter portion 30 of the sleeve 35 to a position under or behind both the one or more ball members 20, 21. With the seat post assembly 100 in the lower position, it may be raised by pulling downward on the lever 140 to full travel at which point the large diameter portion 30 of the sleeve 35 is removed from under or behind the one or more ball members 20, 21 and the inner tube 110 is pushed upwardly relative to the outer tube 120 by gas pressure within the spring chamber 10.

Figure 15A:
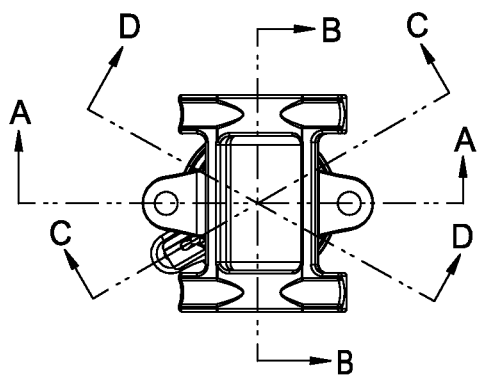
Figures 15F, 15G:
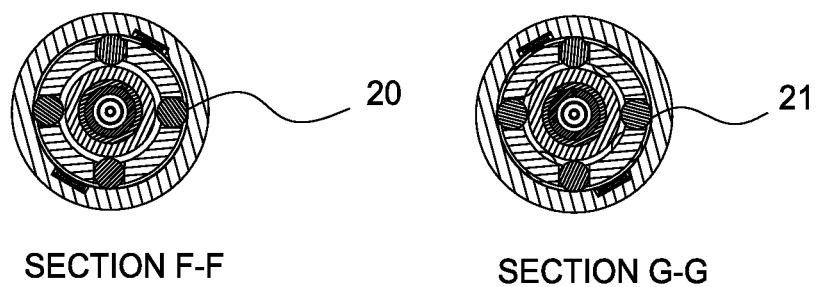
Figures 16A, 16B, 16C:
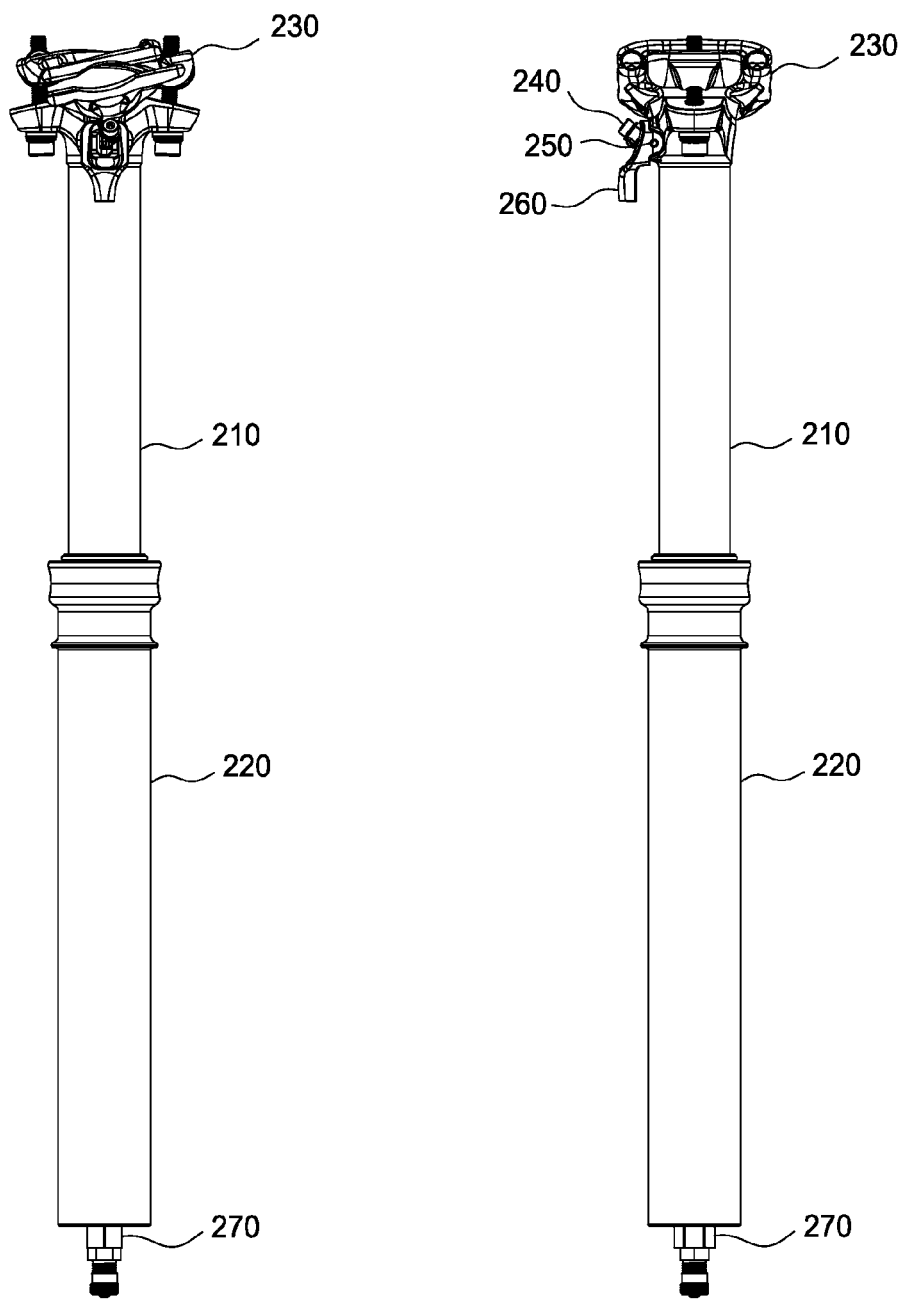
Figure 16D:
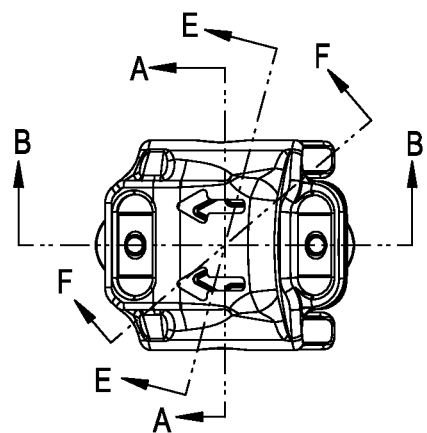
Figure 16G:
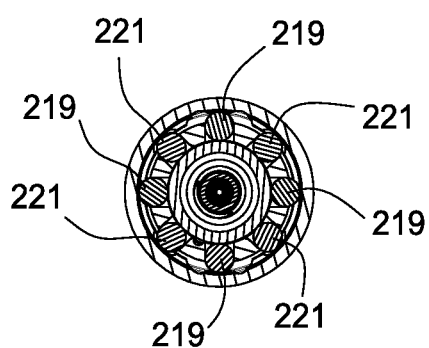
Figure 16H:
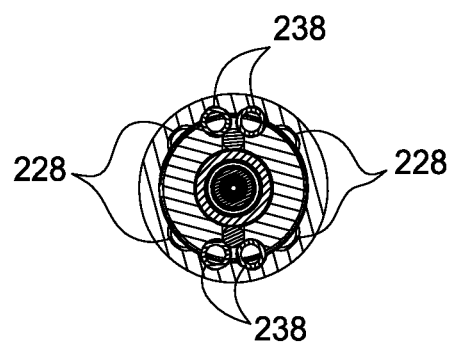
Figure 17D:
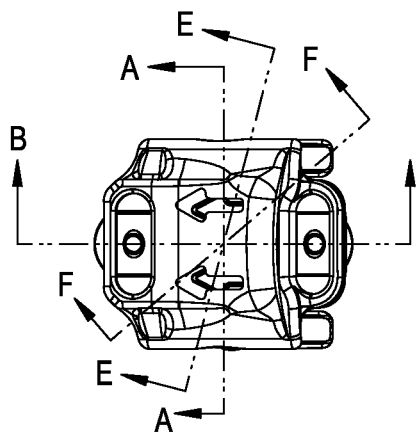
Figure 17G:
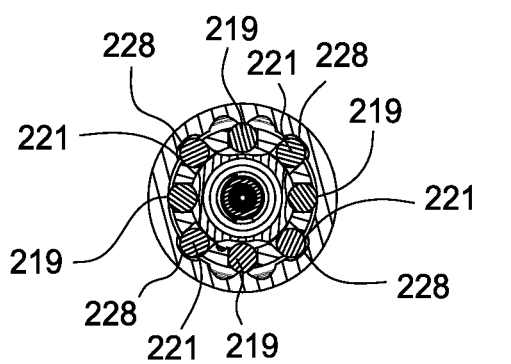
Figure 17H:
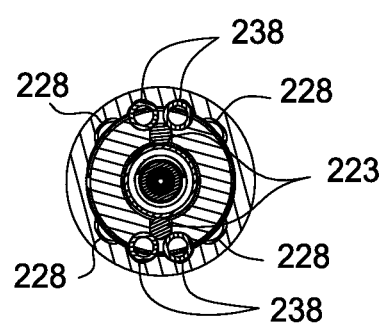
Figure 18D:
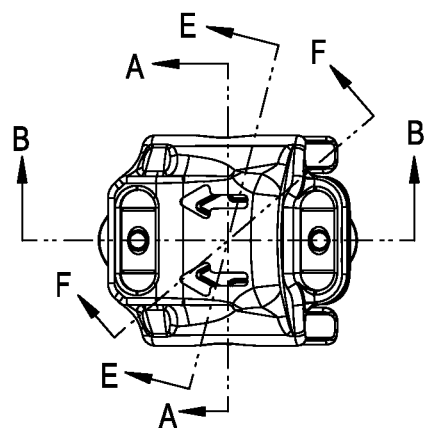
Figure 18G:
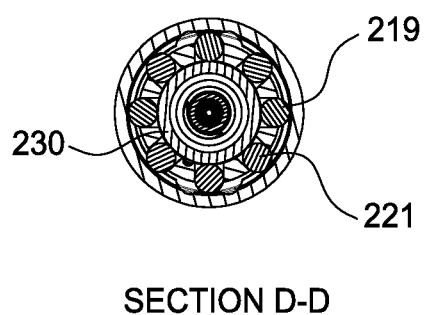
Figure 18H:
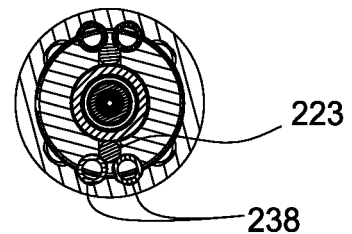
Figure 19A:
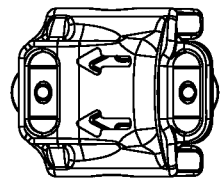
Figure 19B:
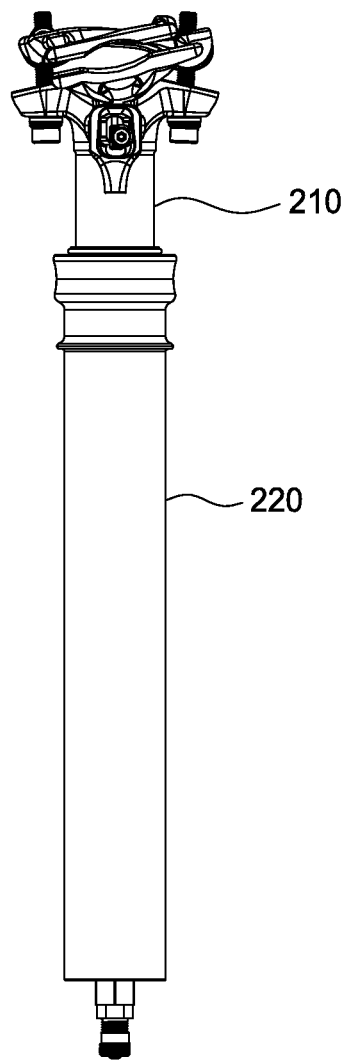
Figure 19C:
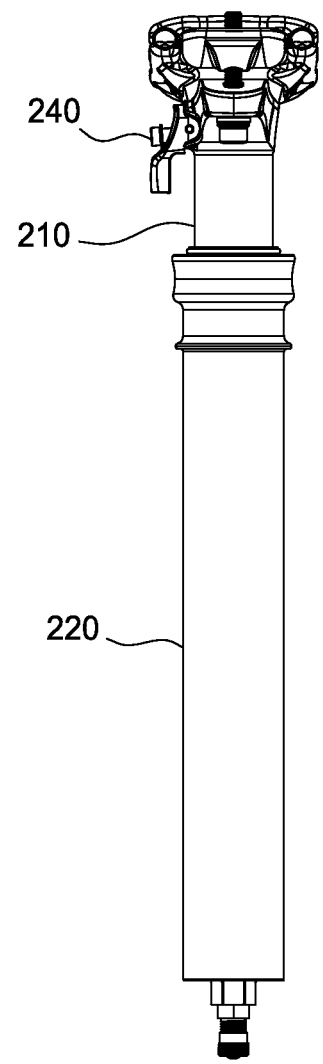
Figure 19D:
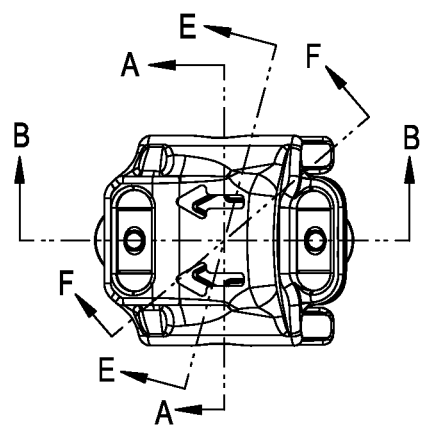
Figure 19G:
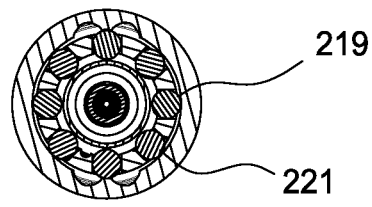
Figure 19H:
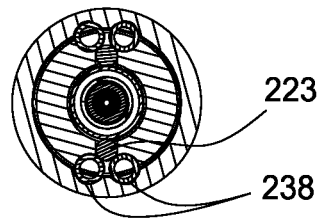
Figure 20A:
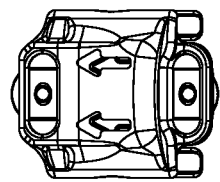
Figure 20B:
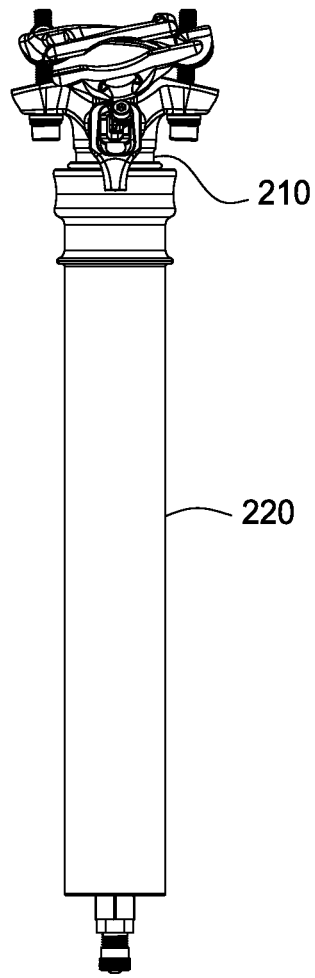
Figure 20C:
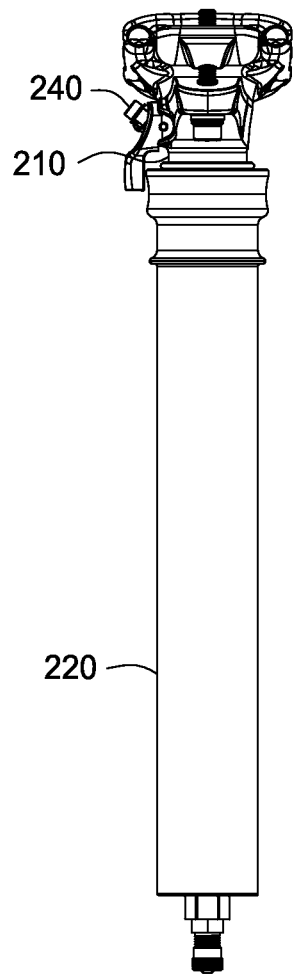
Figure 20D:
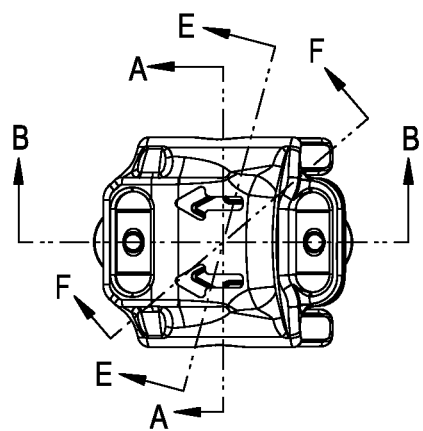
Figure 20G:
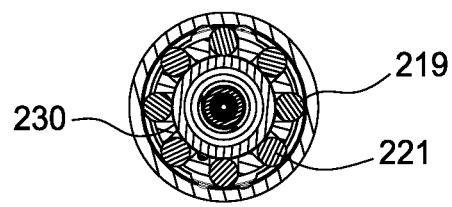
Figure 20H:
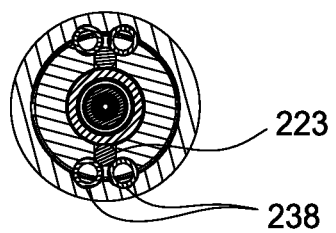

FIGS. 15A-15E illustrates the seat post assembly 100 during the transition from the intermediate seat post position to the lower or compressed seat post position, and after release of the lever 140. As illustrated in FIG. 15E for example, the propensity against the spring 152 leaves a gap 153 until the one or more ball members 20, 21 move radially outward into the lower ball locking recess 127 upon arrival at the lower position, as described above with respect to FIGS. 12A-14D. When the one or more ball members 20, 21 arrive at the lower ball locking recess 127, they move radially outward therein with the large diameter portion 30 of the sleeve 35 underneath or behind the one or more ball members 20, 21 to thereby lock the seat post assembly 100 in the compressed or lower seat post position.

FIGS. 16A-16J illustrate a seat post assembly 200 for a vehicle, such as a bicycle. The embodiments of the seat post assembly 100 illustrated in FIGS. 1A-15G and described herein may be used with the embodiments of the seat post assembly 200 illustrated in FIGS. 16A-21E, and vice versa. The components of the seat post assembly 200 that are similar to those of the seat post assembly 100 may include the same reference numeral ending but with at "200" series designation. Although referenced in the drawings, a full description of each component will not be repeated herein for brevity.

The seat post assembly 200 illustrated in FIGS. 16A-16J is locked in the extended or upper seat post position. The seat post assembly 200 includes the inner tube 210 telescopically movable within the outer tube 220. The upper end of the inner tube 210 includes the seat retainer 230 for retaining a selected riding saddle or bicycle seat. The inner tube 210 further includes the cable guide 260, and the lever 240 coupled thereto and pivotable about the pin 250. The lower end of the outer tube 220 includes the fill valve 270, such as a gas fill valve of any suitable type, including for example a Schrader valve or a Presta valve.

One difference of the seat post assembly 200 with respect to the seat post assembly 100 is the form of the lower end of the inner tube 210. As illustrated in FIG. 16F for example, the lower end of the inner tube 210 includes a plurality of lower holes 275 disposed through the wall of the inner tube 210 for supporting one or more first ball members 219 and one or more second ball members 221, which are axially and symmetrically positioned adjacent to each other about the inner tube 210. The axial ball tracks 228 are provided along the inner surface of the outer tube 220 for guiding the one or more second ball members 221 from the upper seat post position to the intermediate seat post position. The lower end of the inner tube further includes two sets of upper holes 295 axially spaced apart and disposed through the wall of the inner tube 210 for supporting one or more third ball members 223.

Another difference is a second sleeve 231 that is disposed adjacent to the sleeve 235 having the large diameter portion 230 for urging the first and/or second ball members 219, 221 into the upper, intermediate, and/or lower ball lock recesses 225, 226, 227, respectively, which are spaced axially along the length of the outer tube 220. The second sleeve 231 is disposed around the actuator 234 and is moveable with the sleeve 235 relative to the inner tube 210 and the third ball members 223. The second sleeve 231 includes large diameter portions 241 for urging the third ball members 223 radially outward into engagement with the keys 238, which travel along axial slots 239 formed in the inner surface of the outer tube 220. The third ball members 223 are urged into the keys 238, which are urged into the axial slots 239 to secure and ensure that the inner tube 210 is rotationally locked with the outer tube 220. The second sleeve 231 also includes smaller diameter or tapered portions 242 for relieving the engagement between the third ball members 223 and the keys 238 during axial transition of the seat post assembly between seat post positions. The plurality of keyways 285 are also included on the exterior of the inner tube 210 for supporting the keys 238.

Finally, in addition to the spring 252 that biases the sleeve 235 toward the end of the actuator 234, another biasing member, such as spring 254, is positioned between an inner shoulder of the second sleeve 231 and a retainer 256 coupled to the actuator 234 to bias the second sleeve 231 toward the sleeve 235 and the end of the actuator 234. The springs 252, 254 maintain the sleeves 235, 231 in an initial position with respect to the first, second, and third ball members 219, 221, 223 when the actuator 234 is not being actuated by the lever 240 and/or when the seat post assembly 200 is in one of the upper, intermediate, and/or lower seat post positions. When in the initial position, the large diameter portions 230, 241 of the sleeves 235, 231 are positioned underneath or behind the first, second, and third ball members 219, 221 and 223, respectively.

As illustrated in FIG. 16E for example, the inner tube 210 is received in the outer tube 220 through the sliding seal head/wiper assembly 205, which may provide a seal for the spring chamber 215 disposed within the outer tube 220. The seat post assembly 100 is locked in the extended or upper seat post position by the first ball members 219 that are engaged with the inner tube 210 through the one or more lower holes 275, and the outer tube 220 in the upper ball lock recess 225. The first ball members 219 are retained in a radially extended position, corresponding to the locked seat post position, by the large diameter portion 230 of the sleeve 235, which is axially movable with and by the actuator 234.

The actuator 234 is axially movable by means of the lever 240, which pivots about the pin 250, and specifically in one embodiment because the fork arm 245 engages the roll pin 246 that extends through and to either side of the actuator 234.

When the lever 240 is pulled toward the cable guide 260, by a cable installed there through and attached to the lever 240, the fork arm 245 moves in a direction opposite the lever 240 and pulls on the roll pin 246. While one end of the cable passes through the cable guide 260 and attaches to the lever 240, another end of the cable according to one embodiment is attached to and operated by a manual lever 300 (illustrated in FIGS. 21A-21 E for example) having an index system for positively corresponding to the extended or upper, intermediate, and compressed or lower seat post positions. As the roll pin 246 is forced upward, so too is the actuator 234, thereby compressing the spring 251. Thus when tension on the cable and corresponding force on the lever 240 is released, the lever 240 and the actuator 234 return to the previous initial position. Further, as the actuator 234 is moved upward, so too are the sleeve 235 and the second sleeve 231 moved upward, thereby moving the large diameter portions 230, 241, respectively, up and out from under or behind the first, second, and third ball members 219, 221 and 223, respectively. The actuator 234 may extend outside of the sealed spring chamber 215 and is sealed through the chamber bulkhead 236 comprising one or more seals, and is held from "falling into" the spring chamber 215 by the stop ring 232.

The plurality of keys 238 mounted to the inner tube 210 in the keyways 285 travel in axial slots 239 formed in the outer tube 220 to maintain relative rotational orientation of the inner tube 210 and the outer tube 220 and to maintain axial travel limits of the inner tube 210 within the outer tube 220. The third ball members 223 may also be urged into contact with the keys 238 by the large diameter portions 241 of the second sleeve 231 when the actuator 234 is in the relaxed or initial position. When the actuator 234 is actuated, the large diameter portions 241 of the second sleeve 231 may be removed from underneath or behind the third ball members 223 so that they may retract radially inward from rigid engagement with the keys 238 to facilitate uninhibited and smooth travel of the inner tube 220 to the different seat post positions.

FIGS. 17A-17D illustrate one embodiment of the seat post assembly 200 when actuated for movement into the intermediate seat post position. FIGS. 17E-17J illustrate cross sectional views of the seat post assembly of FIGS. 17A-D. FIG. 17F shows that the lever 240 has been pulled or actuated to an intermediate position, and the fork arm 245 has raised the roll pin 246 and thus the actuator 234 to a position where the large diameter portion 230 of the sleeve 235 is removed from supporting the first ball members 219, while the second ball members 221 remain supported by the large diameter portion 230 but are positioned within the axial ball tracks 228. As such, the first ball members 219 are free to move out of engagement from the upper ball lock recess 225 of the outer tube 220, and the second ball members 221 are free to travel downward along and within the axial ball tracks 228 of the outer tube 220. In addition, the large diameter portions 241 of the second sleeve 231 are removed from urging the third ball members 223 into contact with the keys 238 to facilitate the transition of the seat post assembly 200 from the upper seat post position to the intermediate seat post position. A compressive or downward force (e.g. the weight of a rider) must be applied to the saddle or seat mounted on the seat post assembly 200 to cause contraction of the seat post assembly 200 while the actuator 234 is in the actuated intermediate position. This is because the spring gas pressure (e.g. 25 psi or 15 to 50 psi) within the spring chamber 215 exerts a force tending to extend the seat post assembly 200, which is how it is extended when actuated.

FIGS. 18A-18D illustrate one embodiment of the seat post assembly 200 when locked in the intermediate seat post position. FIGS. 18E-18J illustrate cross sectional views of the seat post assembly of FIGS. 18A-D. When locked in the intermediate position, the first and second ball members 219, 221 extend into the intermediate ball lock recess 226 and are supported by the large diameter portion 230 of the sleeve 235. The sleeve 235 has been re-positioned with the large diameter portion 230 under or behind both of the first and second ball members 219, 221 because the lever 240 has been released and the compression force of the spring 251 has returned the actuator 234 and the sleeve 235 to the lower initial position relative to the inner tube 210. The second ball members 221 traveled axially downward in the axial ball tracks 228, which end in the intermediate ball lock recess 226, thereby providing a positive location and stop for the intermediate seat post position, so long as the lever 240 and the actuator 234 are initially positioned for intermediate travel only. According to one embodiment, the intermediate seat post position cannot be passed while compressing the seat post assembly 200 so long as the lever 240 is positioned for intermediate travel (e.g. when an operating lever is for example indexed in the intermediate travel mode). When the second ball members 221 exit the axial ball tracks 228, they are aligned with the intermediate ball locking recess 226.

FIGS. 19A-19D illustrate one embodiment of the seat post assembly 200 when actuated for movement into the compressed or lower seat post position. FIGS. 19E-19J illustrate cross sectional views of the seat post assembly of FIGS. 19A-D. FIG. 17F shows the lever 240 actuated to full travel whereby the spring 251 is correspondingly compressed, the large diameter portions 230, 241 of the sleeves 235, 231 are removed from beneath or behind the first, second, and third ball members 219, 221, 223, and the inner tube 210 is traveling downward within the outer tube 220 by virtue of applied rider weight and while compressing gas in the spring chamber 215.

FIGS. 20A-20D illustrate one embodiment of the seat post assembly 200 when locked in the compressed or lower seat post position. FIGS. 20E-20J illustrate cross sectional views of the seat post assembly of FIGS. 20A-D. FIG. 20F shows that the lever 240 has been released and the spring 251 has returned the actuator 234 relatively downward and the large diameter portions 230, 241 of the sleeves 235, 231 to a position under or behind both the first, second, and third ball members 219, 221, 223. When the first and second ball members 219, 221 arrive at the lower ball lock recess 227, they move radially outward therein with the large diameter portion 230 of the sleeve 235 underneath or behind the first and second ball members 219, 221 to thereby lock the seat post assembly 200 in the lower seat post position.

With the seat post assembly 200 in the compressed or lower seat post position, it may be raised by pulling downward on the lever 240 to full travel at which point the large diameter portions 230, 241 of the sleeves 235, 231 are removed from under or behind the first, second, and third ball members 219, 221, 223 and the inner tube 210 is pushed upwardly relative to the outer tube 220 by gas pressure within the spring chamber 215.

Figure 21B:
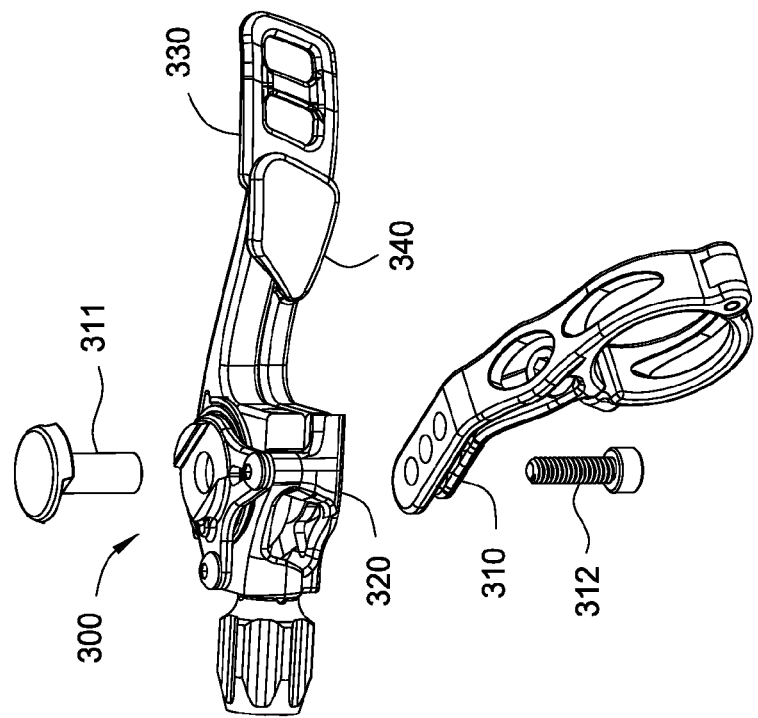
Figure 21A:
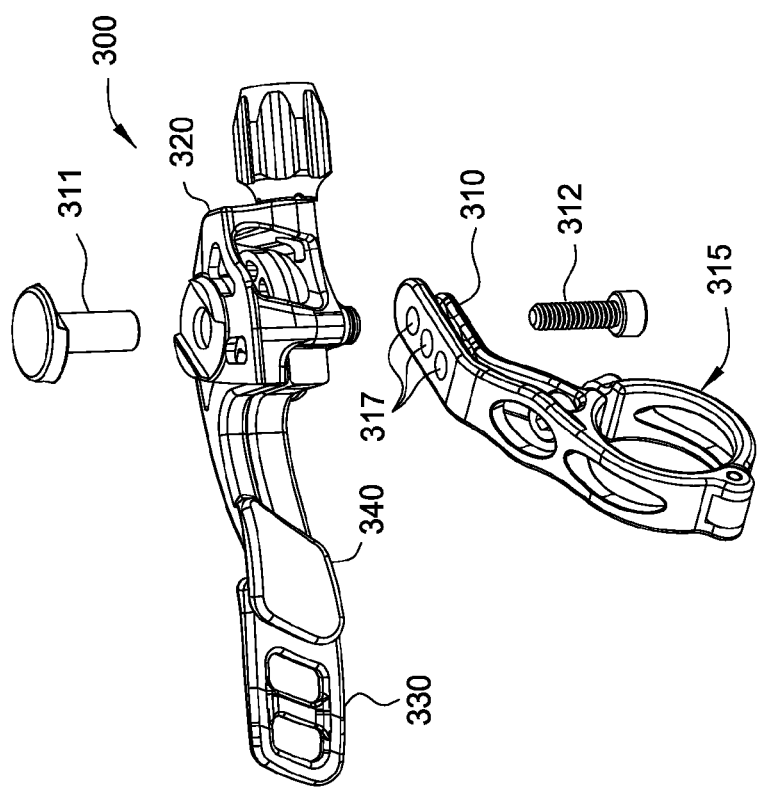

FIGS. 21A-21E illustrate one embodiment of a lever assembly 300 that can be coupled to the levers 140, 240 by a single cable or at least one cable for operating the seat post assemblies 100, 200 as described herein. The lever assembly 300 may be coupled to the handlebar of a bicycle for manual operation by the user. The lever assembly 300 may include a support member 310 for supporting a housing 320, which rotatably supports a first lever 330 and a second lever 340. A single cable or at least one cable may be attached to at least the first lever 330. One or more fasteners 311, 312 may be used to easily and quickly connect and disconnect the lever assembly 300 to the bicycle. In one embodiment, the handlebar of a bicycle may be disposed through an opening 315 of the support member 310 at a desired position, and the housing 320 may be adjustably secured to the support member 310 at one or more locations 317 depending on user preference. As illustrated in FIGS. 21A and 21B, the lever assembly 300 is adjustable for operation with both right-handed and left-handed users. The lever assembly 300, and in particular the housing 320 can be flipped, inverted or turned upside down from an upright position with respect to the support member 310 to easily convert the lever assembly 300 for use on the right or left hand side of the bicycle handlebar, and for use above or below the bicycle handlebar, using a single fastener.

As illustrated in FIGS. 21C-21E, the first and second levers 330, 340 are rotatably coupled to the housing 320 and are movable to one or more preset positions that correspond to the extended or upper, intermediate, and compressed or lower seat post positions. The first lever 330 may be longer than the second lever 340, and a portion of the second lever 340 overlaps a portion of the first lever 330.

The first lever 330 (or primary lever) may be configured to rotate through a first angular distance to pull the full amount of cable (e.g. compare FIG. 21C to FIG. 21E) to actuate the actuators 34, 234 as described above to their full travel to move the seat post assemblies 100, 200 to the compressed or lower seat post position, or to release from the lowest position to move the seat post assemblies 100, 200 to the extended or upper seat post position. The second lever 340 (or secondary lever) may only move or rotate through a portion such as one-half of the first angular distance and pulls one-half of the cable (e.g. compare FIG. 21C to FIGS. 21D, E). FIG. 21C illustrates the lever assembly 300 in the normal position. The second lever 340 may be pushed or moved halfway through the first angular distance from the position in FIG. 21C to the position in FIG. 21D until it reaches a hard-stop (such as a portion of the housing 320); in this way the second lever 340 is only able to travel a smaller angular distance than the first lever 330. By virtue of the aforementioned overlap between the two levers 330, 340, a force applied to the second lever 340 in one direction causes the first lever 330 to move in the same direction at the same time, and therefore pull the cable to effect seat post adjustment. Following that the user may locate (e.g. with the thumb) another part of the first lever 330, such as the longer part of the first lever 330 projecting beyond the end of the second lever 340 and then the first lever 330 may be pushed or moved further through the first angular distance to the full position in FIG. 21E to go to full travel. The lever assembly 300 may therefore allow the user to easily find the intermediate position by pushing the second lever 340 until it contacts its hardstop halfway through the rotational travel of the first lever 330. This action will cause the movement of the first lever 330 halfway through its rotational travel, ensuring that the correct amount of cable is pulled to actuate the lever 140 for example as described above to move the seat post assemblies 100, 200 to the intermediate seat post position. As described above, following that the first lever 330 may be pushed beyond the angular range of the second lever 340 to move the seat post assemblies 100, 200 to the fully extended and/or compressed positions. When the seat post assemblies 100, 200 are in the extended or upper seat post position, the first and second levers 330, 340 may be in the position illustrated in FIG. 21C, which position is ready for operation to adjust seat post assemblies 100, 200 to the intermediate and/or lower seat post positions. In the other direction, the first lever 330 may be pulled back (such as by the user and/or by spring/cable return) until the overlapping portions come into abutment with one another, signaling to the user that the correct position has been reached to adjust the seat post assemblies 100, 200 back to the intermediate seat post position. If the user desires the seat post to be returned to the fully compressed position the first lever 330 can simply be pulled all the way back to the position shown in FIG. 21D. In doing so, and by virtue of the lever overlap, the second lever 340 is also returned to the initial position shown in that Figure, ready for the next seat post adjustment. This arrangement ensures that the first lever 330 cannot be moved back to the initial position (FIG. 21D) without moving the second lever 340 back at the same time. Although described herein for use with the seat post assemblies 100, 200, the lever assembly 300 may be used with other vehicle systems, such as a vehicle suspension system. In one embodiment, the lever assembly 300 may be operable to control the actuation and/or adjustment of a bicycle suspension system.

In one embodiment, a seat post assembly may comprise an inner tube; an outer tube telescopically receiving the inner tube; a locking member engaging the inner tube with the outer tube in at least a first position, a second position and a third position; and a stop positively arresting relative motion between the tubes at the at least the second position and optionally at the first and third positions.

In one embodiment, a method for lowering a seat post assembly may comprise positioning a controller in an intermediate position; applying a compressive force to the seat post assembly; and stopping a compression of the seat post at a seat post intermediate position without relieving the compressive force.

In one embodiment, a method of adjusting a seat post assembly that has an inner tube axially movable within an outer tube, includes: locking the inner tube to the outer tube at a first location using a locking member that is coupled to the tube; securing the locking member into engagement with the outer tube using an actuator to lock the inner tube to the outer tube; moving the actuator against the bias of a biasing member to release the locking member from engagement with the outer tube at the first location; and moving the inner tube from the first location to a second location after releasing the locking member.

The method may comprise biasing a sleeve coupled to the actuator to a position beneath or behind the locking member to secure the locking member into engagement with the outer tube. The method may further comprise moving the actuator against the bias of the biasing member to release the locking member from engagement with the outer tube at the second location, and moving the inner tube from the second location to a third location after releasing the locking member.

The locking member may comprise a first plurality of ball members and a second plurality of ball members, and further comprising urging the first plurality of ball members into engagement with the outer tube while preventing the second plurality of ball members from engaging the outer tube at the first location. The method may further comprise stopping axial movement of the inner tube relative to the outer tube using the second plurality of ball members at a position where the first plurality of ball members engage the outer tube at the second location.

The method may further comprise urging a third plurality of ball members into engagement with the outer tube to rotationally secure the inner tube to the outer tube. The method may further comprise controlling actuation of the actuator using a lever assembly comprising a first lever rotatable through a first angular distance, and a second lever rotatable through half of the first angular distance together with the first lever. The method may further comprise rotating the first lever through half of the first angular rotation and into contact with the second lever to thereby actuate the actuator to release the locking member for movement from the first location to the second location on the outer tube. The method may further comprise rotation of the first and second levers together through the other half of the first angular distance to thereby actuate the actuator to release the locking member for movement from the second location to a third location on the outer tube.

While the foregoing is directed to embodiments of the invention, other and further embodiments of the invention may be devised without departing from the basic scope thereof, and the scope thereof is determined by the claims that follow.

The invention claimed is:

1. A seat post assembly, comprising:
an outer tube having an inner wall;
an inner tube having an outer wall, the inner tube axially movable within the outer tube and extending from an open end of the outer tube and terminating in a seat retainer, and a seal interposed between the inner wall of the outer tube and the outer wall of the inner tube to define a pressurizable volume;
the inner tube including a sealed opening therein at a location thereof locatable exteriorly of the outer tube;
a first locking member coupled to the inner tube and operable to lock the inner tube to the outer tube at a first location and at a second location of the outer tube spaced apart along the axial length of the outer tube, and a second locking member coupled to the inner tube at a position circumferentially offset from the first locking member, and operable to stop axial movement of the inner tube relative to the outer tube at the second location; and
an actuator extending through the sealed opening in the inner tube and operable to secure the first locking member into engagement with the outer tube at the first and second locations, and operable to release the first locking member from engagement with the outer tube at the first location of the outer tube to enable movement of the first locking member between the first location and the second location, while maintaining the second locking member extended into engagement with the outer tube between the first and the second locations;
wherein the first locking member comprises a first plurality of ball members and the second locking member comprises a second plurality of ball members, the first and second plurality of ball members symmetrically disposed about the inner tube, wherein the first plurality of ball members are operable to lock the inner tube to the outer tube at both the first and second locations, and wherein the second plurality of ball members are operable to lock the inner tube to the outer tube at the second location but not at the first location.

2. The seat post assembly of claim 1, wherein the second plurality of ball members move within axial slots disposed within the outer tube from the first location to the second location.

3. A seat post assembly, comprising:
a first tube having an inner circumferential wall and a plurality of circumferential recesses extending therein, the recesses spaced along the inner surface of the wall by an extended unrecessed portion of the wall;
a second tube telescopically movable relative to the first tube;
a locking member interposed between the first and second tubes to lock the first tube to the second tube by entry of at least a portion of the locking member into a circumferential recess located in the first tube at a first relative telescopic position between the tubes and at a second relative telescopic position between the tubes; and
an actuator operatively connected to the locking member where a first position of the actuator corresponds to a locked condition between the tubes and a second position of the actuator corresponds to an unlocked condition between the tubes wherein at least a portion of the locking member is free to move along an unrecessed portion of the inner wall of the first tube between adjacent circumferential recesses;
wherein the inner wall of the first tube includes three circumferential recesses therein corresponding to three discrete locking positions of the first and second tubes, and at least a portion of the locking member is received within the first and the second recesses when the first and second tubes are in the first and second locking positions and a greater portion of the locking member is received in the third recess when the first and second tubes are in the third locking position.

4. The seat post assembly of claim 3, wherein a recess extends axially between the positions of the first and the second recess, and at least an additional, different portion of the locking member is received within the axially extending recess when the first tube and second tube are disposed intermediate of the first and second positions.

5. A seat post assembly, comprising:
an outer tube;
an inner tube axially movable within the outer tube;
a locking member coupled to the inner tube and operable to lock the inner tube to the outer tube at a first location and at a second location spaced apart along the axial length of the outer tube and a second locking member coupled to the inner tube at a position axially and circumferentially offset from the locking member, and operable to stop axial movement of the inner tube relative to the outer tube at the second location; and
an actuator operable to secure the locking member into engagement with the outer tube at the first and second locations, and operable to release the locking member from engagement with the outer tube to move the locking member from the first location to the second location;
wherein the locking member comprises a first plurality of ball members and the second locking member comprises a second plurality of ball members, wherein the first plurality of ball members are operable to lock the inner tube to the outer tube at both the first and second locations, and wherein the second plurality of ball members are operable to lock the inner tube to the outer tube at the second location but not at the first location.

* * * * *